United States Patent
Sato et al.

(10) Patent No.: US 11,483,452 B2
(45) Date of Patent: Oct. 25, 2022

(54) IMAGE PROCESSING METHOD AND APPARATUS DETERMING CAUSE OF IMAGE DEFECT BASED ON MIXED COLOR TEST IMAGE

(71) Applicant: KYOCERA Document Solutions Inc., Osaka (JP)

(72) Inventors: Koji Sato, Osaka (JP); Kazunori Tanaka, Osaka (JP); Takuya Miyamoto, Osaka (JP); Kanako Morimoto, Osaka (JP); Rui Hamabe, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/558,250

(22) Filed: Dec. 21, 2021

(65) Prior Publication Data

US 2022/0210293 A1 Jun. 30, 2022

(30) Foreign Application Priority Data

Dec. 24, 2020 (JP) .............................. JP2020-214811

(51) Int. Cl.
*H04N 1/60* (2006.01)
*H04N 1/00* (2006.01)
*H04N 1/52* (2006.01)
*H04N 1/58* (2006.01)

(52) U.S. Cl.
CPC ....... *H04N 1/6041* (2013.01); *H04N 1/00023* (2013.01); *H04N 1/00029* (2013.01); *H04N 1/00034* (2013.01); *H04N 1/00068* (2013.01); *H04N 1/00074* (2013.01); *H04N 1/00082* (2013.01); *H04N 1/52* (2013.01); *H04N 1/58* (2013.01)

(58) Field of Classification Search
None
See application file for complete search history.

(56) References Cited

U.S. PATENT DOCUMENTS

| | | | |
|---|---|---|---|
| 11,201,970 B2 * | 12/2021 | Nishizawa | H04N 1/00068 |
| 2022/0206424 A1 * | 6/2022 | Tanaka | G03G 15/5054 |
| 2022/0206425 A1 * | 6/2022 | Miyamoto | G03G 15/55 |
| 2022/0207701 A1 * | 6/2022 | Morimoto | G06V 10/36 |
| 2022/0207702 A1 * | 6/2022 | Tanaka | G06V 10/75 |
| 2022/0207703 A1 * | 6/2022 | Hamabe | G06V 10/36 |
| 2022/0207704 A1 * | 6/2022 | Morimoto | G06T 7/13 |
| 2022/0207705 A1 * | 6/2022 | Morimoto | G06T 7/0004 |

FOREIGN PATENT DOCUMENTS

JP 2017083544 A 5/2017

* cited by examiner

*Primary Examiner* — Scott A Rogers
(74) *Attorney, Agent, or Firm* — Alleman Hall Creasman & Tuttle LLP

(57) ABSTRACT

A processor identifies a specific part composed of a plurality of significant pixels in a mixed-color test image. Furthermore, the processor identifies a color vector. The color vector represents a vector in a color space from one of a color of the specific part in the mixed-color test image and a color of a reference area including a periphery of the specific part to the other. Furthermore, the processor determines which of a plurality of image creating portions of an image forming device corresponding to a plurality of developing colors, is a cause of an image defect, based on the color vector identified from the mixed-color test image.

11 Claims, 11 Drawing Sheets

IMAGE PROCESSING METHOD AND APPARATUS DETERMING CAUSE OF IMAGE DEFECT BASED ON MIXED COLOR TEST IMAGE

INCORPORATION BY REFERENCE

This application is based upon and claims the benefit of priority from the corresponding Japanese Patent Application No. 2020-214811 filed on Dec. 24, 2020, the entire contents of which are incorporated herein by reference.

BACKGROUND

The present disclosure relates to an image processing method and an image processing apparatus for determining a cause of an image defect based on a test image.

An image forming apparatus such as a printer or a multifunction peripheral executes a print process to form an image on a sheet. In the print process, an image defect such as a vertical stripe, a horizontal stripe, a noise point, or density variation may be generated on the image formed on an output sheet.

For example, in a case where the image forming apparatus executes the print process by an electrophotographic method, the image defect may be caused by any of various parts such as a photoconductor, a charging portion, a developing portion, and a transfer portion. In addition, it requires skill to determine the cause of the image defect.

In addition, there is known an image processing apparatus that preliminarily stores, as table data, correspondence between: phenomena that cause the vertical stripe as an example of the image defect; and feature information such as the color of the vertical stripe, density, and the number of screen lines, wherein a phenomenon that has caused the vertical stripe is identified based on information of the color of an image of the vertical stripe, density, or the number of screen lines in a test image and the table data.

In the table data, the range of a parameter, such as the color of the image, density, or the number of screen lines, is set by thresholds for each type of phenomenon that may cause the vertical stripe.

SUMMARY

In an image processing method according to an aspect of the present disclosure, a processor determines a cause of an image defect based on a mixed-color test image that is a combination of a plurality of single-color halftone images that correspond to a plurality of developing colors, the mixed-color test image being obtained through an image reading process performed on an output sheet output from an image forming device. The image processing method includes the processor identifying a specific part composed of a plurality of significant pixels in the mixed-color test image. Furthermore, the image processing method includes the processor identifying a color vector that represents a vector in a color space from one of a color of the specific part in the mixed-color test image and a color of a reference area including a periphery of the specific part to the other. Furthermore, the image processing method includes the processor determining which of a plurality of image creating portions of the image forming device corresponding to the plurality of developing colors, is the cause of the image defect, based on the color vector identified from the mixed-color test image.

An image processing apparatus according to another aspect of the present disclosure includes the processor that executes processes of the image processing method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Processing Apparatus 10]

An image processing apparatus 10 according to an embodiment includes an image forming device 2 that executes a print process. In the print process, an image is formed on a sheet. The sheet is an image formation medium such as a sheet of paper or a sheet-like resin material.

Furthermore, the image processing apparatus 10 includes an image reading device 1 that executes a reading process to read an image from a document sheet. For example, the image processing apparatus 10 is a copier, a facsimile apparatus, or a multifunction peripheral.

The image targeted to be processed in the print process is, for example, an image read from the document sheet by the image reading device 1 or an image represented by print data received from a host apparatus (not shown). The host apparatus is an information processing apparatus such as a personal computer or a mobile information terminal.

Figure 6:
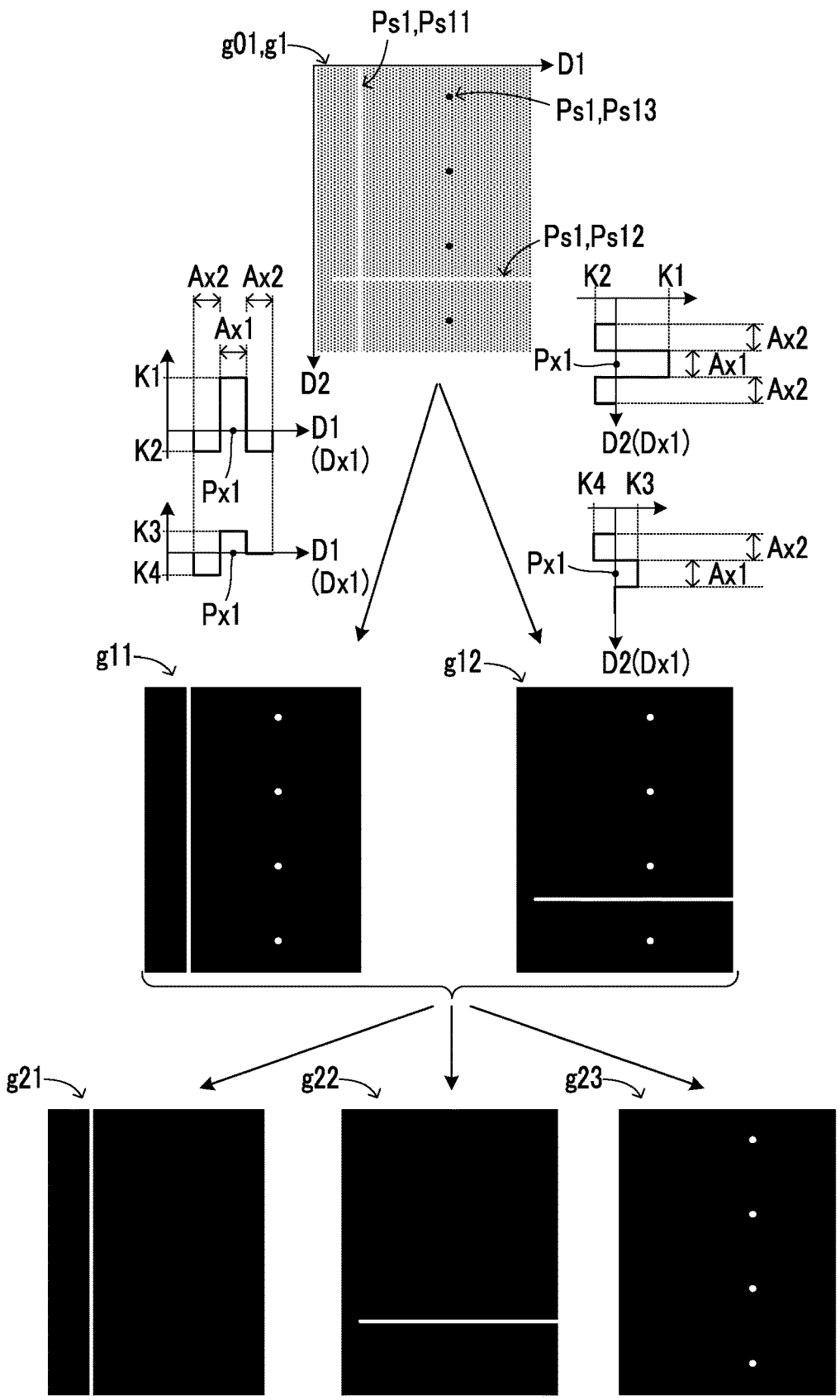
FIG. 6 is a diagram showing an example of a test image including specific parts and examples of pre-process images and feature images generated based on the test image.

Furthermore, in the print process, the image forming device 2 may form a predetermined original test image g01 on a sheet (see FIG. 6). The original test image g01 is an original of a test image g1 that is used to determine whether or not an image defect has been generated by the image forming device 2 and to determine the cause of the image defect (see FIG. 6). The test image g1 is described below.

A copy process includes: the reading process performed by the image reading device 1; and the print process performed by the image forming device 2 based on an image obtained in the reading process.

Figure 1:
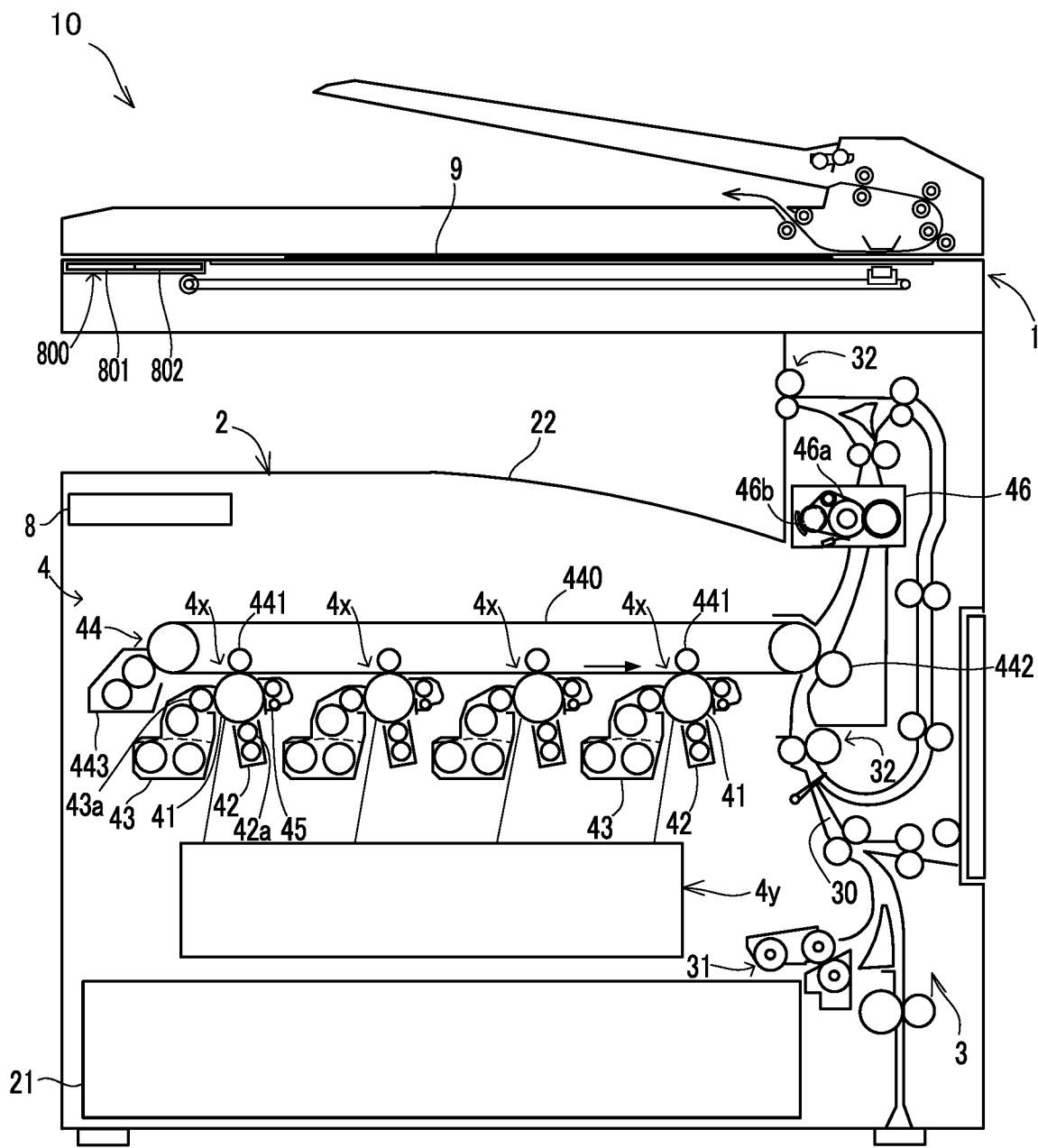
FIG. 1 is a configuration diagram of an image processing apparatus according to an embodiment.

As shown in FIG. 1, the image forming device 2 includes a sheet conveying mechanism 3 and a print portion 4. The sheet conveying mechanism 3 includes a sheet feed-out mechanism 31 and a plurality of pairs of sheet conveying rollers 32.

The sheet feed-out mechanism 31 feeds out a sheet from a sheet storage portion 21 to a sheet conveyance path 30. The plurality of pairs of sheet conveying rollers 32 convey the sheet along the sheet conveyance path 30, and discharge the sheet with an image formed thereon to a discharge tray 22.

The print portion 4 executes the print process on the sheet conveyed by the sheet conveying mechanism 3. In the present embodiment, the print portion 4 executes the print process by an electrophotographic method.

The print portion 4 includes an image creating portion 4x, a laser scanning unit 4y, a transfer device 44, and a fixing device 46. The image creating portion 4x includes a drum-like photoconductor 41, a charging device 42, a developing device 43, and a drum cleaning device 45.

The photoconductor 41 rotates, and the charging device 42 electrically charges the surface of the photoconductor 41 uniformly. The charging device 42 includes a charging roller 42a that rotates while in contact with the surface of the photoconductor 41. The laser scanning unit 4y writes an electrostatic latent image on the charged surface of the photoconductor 41 by scanning a laser light.

The developing device 43 develops the electrostatic latent image as a toner image. The developing device 43 includes a developing roller 43a that supplies the toner to the photoconductor 41. The transfer device 44 transfers the toner image from the surface of the photoconductor 41 to the sheet. It is noted that the toner is an example of granular developer.

The fixing device 46 fixes the toner image on the sheet to the sheet by heating. The fixing device 46 includes a fixing rotating body 46a and a fixing heater 46b, wherein the fixing rotating body 46a rotates while in contact with the sheet and the fixing heater 46b heats the fixing rotating body 46a.

The image forming device 2 shown in FIG. 1 is a tandem-type color printer that is configured to execute the print process to process a color image. As a result, the print portion 4 includes four image creating portions 4x corresponding to four different colors of toner.

In addition, in the tandem-type image forming device 2, the transfer device 44 includes four primary transfer rollers 441, an intermediate transfer belt 440, a secondary transfer roller 442, and a belt cleaning device 443, wherein the four primary transfer rollers 441 correspond to four photoconductors 41.

The four image creating portions 4x respectively form cyan, magenta, yellow, and black toner images on the surfaces of the photoconductors 41. Each of the primary transfer rollers 441 is a part of a corresponding one of the image creating portions 4x.

In each of the image creating portions 4x, the primary transfer roller 441, while rotating, biases the intermediate transfer belt 440 toward the surface of the photoconductor 41. The primary transfer roller 441 transfers the toner image from the photoconductor 41 to the intermediate transfer belt 440. This allows a color image composed of toner images of four colors to be formed on the intermediate transfer belt 440.

In each of the image creating portions 4x, the drum cleaning device 45 removes and collects, from the photoconductor 41, toner that has remained on the photoconductor 41 without being transferred to the intermediate transfer belt 440.

The secondary transfer roller 442 transfers the toner images of the four colors from the intermediate transfer belt 440 to a sheet. It is noted that in the image processing apparatus 10, the photoconductor 41 and the intermediate transfer belt 440 of the transfer device 44 are each an example of an image carrier that rotates while carrying a toner image.

The belt cleaning device 443 removes and collects, from the intermediate transfer belt 440, toner that has remained on the intermediate transfer belt 440 without being transferred to the sheet.

As shown in FIG. 1, the image processing apparatus 10 includes a data processing portion 8 and a human interface device 800 in addition to the image forming device 2 and the image reading device 1. The human interface device 800 includes an operation portion 801 and a display portion 802.

The data processing portion 8 executes various types of data processing concerning the print process and the reading process, and controls various types of electric devices.

The operation portion 801 is a device configured to receive user operations. For example, the operation portion 801 includes either or both of a pushbutton and a touch panel. The display portion 802 includes a display panel that displays information for the users.

Figure 2:
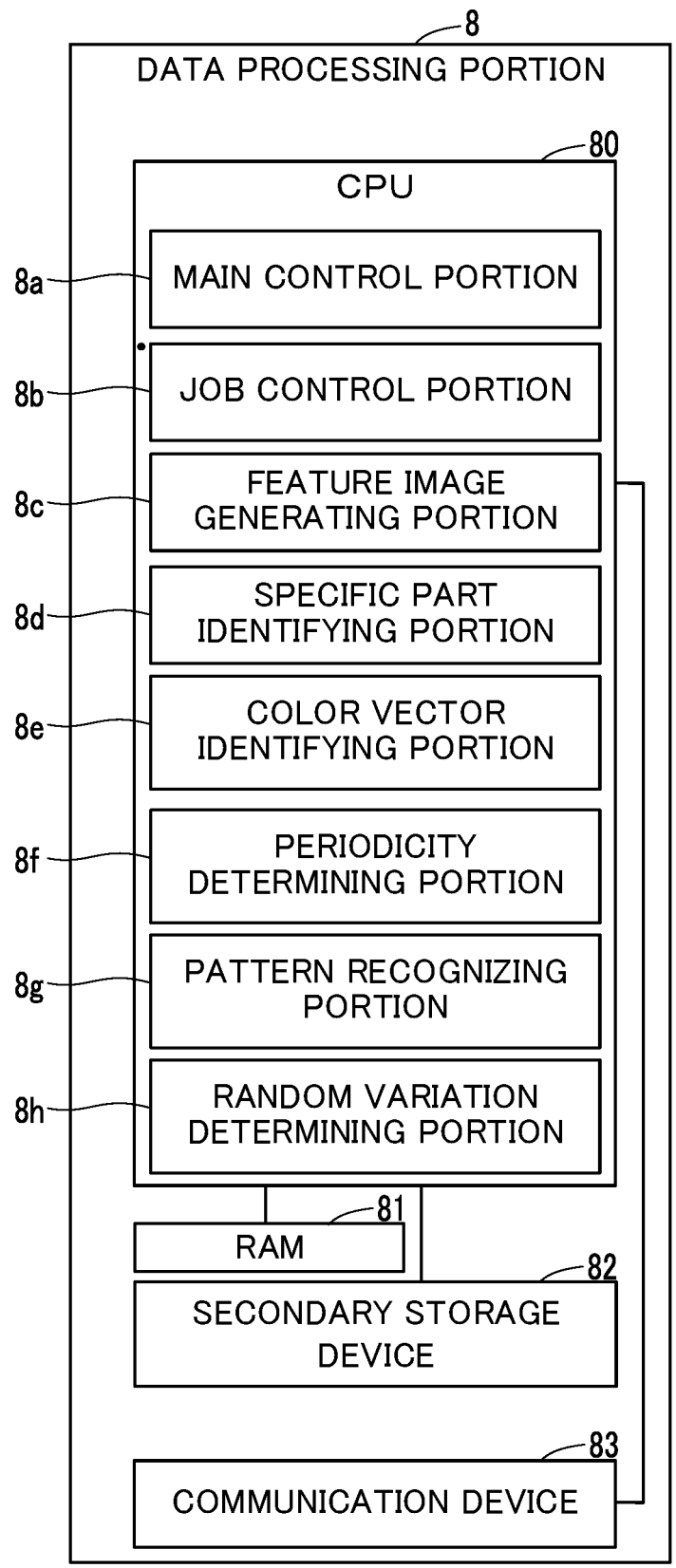
FIG. 2 is a block diagram showing a configuration of a data processing portion in the image processing apparatus according to the embodiment.

As shown in FIG. 2, the data processing portion 8 includes a CPU (Central Processing Unit) 80, a RAM (Random Access Memory) 81, a secondary storage device 82, and a communication device 83.

The CPU 80 is configured to process data received by the communication device 83, and perform controls of various types of image processing and the image forming device 2. The received data may include print data. The CPU 80 is an example of a processor that executes data processing including the image processing. It is noted that the CPU 80 may be realized by another type of processor such as a DSP (Digital Signal Processor).

The communication device 83 is a communication interface device that performs communication with other apparatuses such as the host apparatus via a network such as a LAN (Local Area Network). The CPU 80 performs data transmissions and receptions with the external apparatuses all via the communication device 83.

The secondary storage device 82 is a computer-readable nonvolatile storage device. The secondary storage device 82 stores computer programs executed by the CPU 80 and various types of data referenced by the CPU 80. For example, either or both of a flash memory and a hard disk drive are adopted as the secondary storage device 82.

The RAM 81 is a computer-readable volatile storage device. The RAM 81 primarily stores the computer programs executed by the CPU 80 and data that is output and referenced by the CPU 80 during execution of the programs.

The CPU 80 includes a plurality of processing modules that are realized when the computer programs are executed. The plurality of processing modules include a main control portion 8a and a job control portion 8b. It is noted that a part or all of the plurality of processing modules may be realized by another type of processor such as the DSP that is independent of the CPU 80.

The main control portion 8a executes a process to select a job in response to an operation performed on the operation portion 801, a process to display information on the display portion 802, and a process to set various types of data. Furthermore, the main control portion 8a executes a process to determine the content of data received by the communication device 83.

The job control portion 8b controls the image reading device 1 and the image forming device 2. For example, in a case where the data received by the communication device 83 includes print data, the job control portion 8b causes the image forming device 2 to execute the print process.

In addition, when the main control portion 8a has detected a copy request operation performed on the operation portion 801, the job control portion 8b causes the image reading device 1 to execute the reading process and causes the image forming device 2 to execute the print process based on an image obtained in the reading process.

Figure 7:
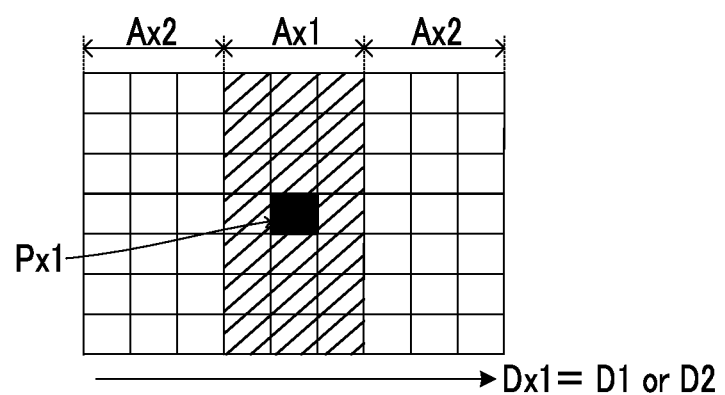
FIG. 7 is a diagram showing an example of a focused area and adjacent areas that are sequentially selected from the test image in a main filter process executed by the image processing apparatus according to the embodiment.

In the print process, an image defect such as a vertical stripe Ps11, a horizontal stripe Ps12, a noise point Ps13, or density variation may be generated on an image formed on an output sheet (see FIG. 6, FIG. 7).

As described above, the image forming device 2 executes the print process by the electrophotographic method. In this case, the image defect may be caused by any of various parts such as the photoconductor 41, the charging device 42, the developing device 43, and the transfer device 44. In addition, it requires skill to determine the cause of the image defect.

In the present embodiment, the image forming device 2 executes a test print process to form a predetermined original test image g01 on a sheet (see FIG. 6).

For example, when the main control portion 8a has detected a test output operation performed on the operation portion 801, the job control portion 8b causes the image forming device 2 to execute the test print process. In the following description, the sheet on which the original test image g01 has been formed is referred to as a test output sheet 9 (see FIG. 1).

Furthermore, when the test print process has been executed, the main control portion 8a displays a predetermined guide message on the display portion 802. The guide message urges setting the test output sheet 9 on the image reading device 1 and then performing a reading start operation on the operation portion 801.

When the main control portion 8a has detected the reading start operation performed on the operation portion 801 after the guide message was displayed on the display portion 802, the job control portion 8b causes the image reading device 1 to execute the reading process. This allows the original test image g01 to be read by the image reading device 1 from the test output sheet 9 output from the image forming device 2, and a read image corresponding to the original test image g01 is obtained.

Subsequently, as described below, the CPU 80 executes a process to determine whether or not an image defect has been generated and determine the cause of the image defect based on the test image g1 that is the read image or a compressed image of the read image (see FIG. 6). The CPU 80 is an example of a processor that executes a process of an image processing method to determine whether or not an image defect has been generated and determine the cause.

It is noted that the test image g1 may be read from the test output sheet 9 by a device other than the image reading device 1, such as a digital camera.

Meanwhile, the image forming device 2 is a tandem type for executing a color print and includes a plurality of image creating portions 4x for different developing colors (see FIG. 1).

In the image forming device 2, it is necessary to determine which of the plurality of image creating portions 4x is the cause of the image defect. For the determination, the CPU 80 may determine the image defect based on a test image of a single color for each of the developing colors.

However, in order to reduce the consumption of sheets and developer, it is desirable that as small number of test images as possible are printed to determine the image defect.

Figure 3:
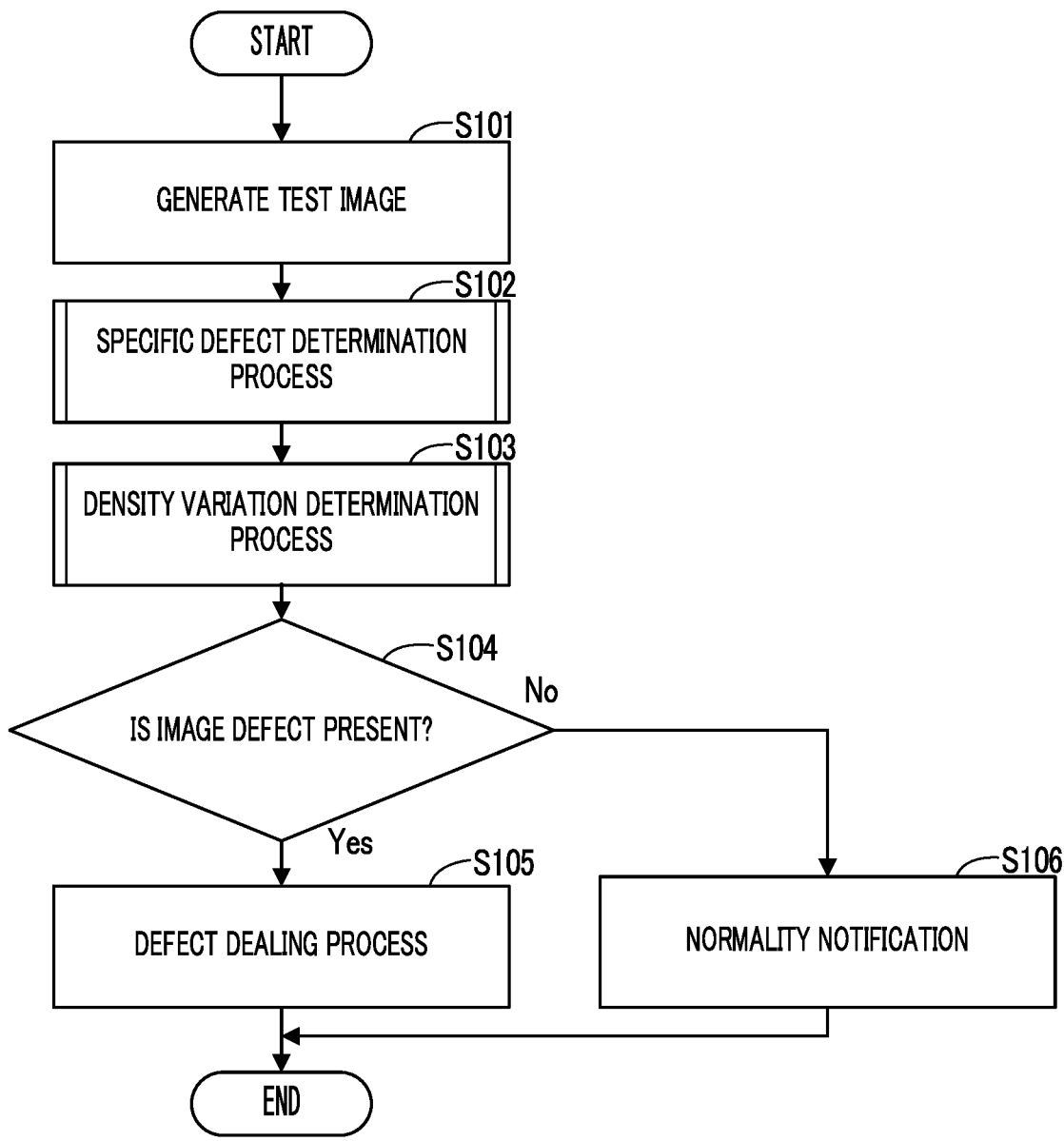
FIG. 3 is a flowchart showing an example of a procedure of an image defect determination process in the image processing apparatus according to the embodiment.

The CPU 80 of the image processing apparatus 10 executes an image defect determination process (see FIG. 3). This makes it possible for the CPU 80 to determine, with less number of test images g1, the cause of the image defect that is generated in the image forming device 2 of the tandem type.

In addition, the test image g1 may include a plurality of types of image defects. In this case, it is desirable for simplification of the determination process and improvement of the determination accuracy that the causes of the image defects are determined from a plurality of images that have been extracted respectively in correspondence with the plurality of types of image defects.

On the other hand, it is desirable that, in the image processing apparatus 10, a simple process is executed to extract, from the test image g1, parts including image defects for each type of image defect and generate determination target images.

The CPU 80 is configured to execute the image defect determination process to execute a simple process to extract, from the test image g1, a part including an image defect for each type of image defect, and determine the cause for each type of image defect.

In addition, in a case where the cause of the image defect is determined by comparing values of particular image parameters, such as image color, density, and the number of screen lines, with predetermined thresholds, a determination omission or an erroneous determination is apt to occur.

On the other hand, the image pattern recognition process is suited to classify input images into a plurality of events with high accuracy. For example, the pattern recognition process is a process to determine which of a plurality of event candidates corresponds to an input image, based on a learning model that has been preliminarily learned using, as teacher data, sample images corresponding to the plurality of event candidates.

However, an image has a large amount of information, and there are a plurality of types of image defects such as the vertical stripe Ps11, the horizontal stripe Ps12, the noise point Ps13, and the density variation (see FIG. 6). Furthermore, there are many candidates for the cause of image defect for each of the plurality of types of image defects.

As a result, in a case where the test image g1 including an image defect is used as an input image for the pattern recognition process, the pattern recognition process requires an extremely large operation amount. Accordingly, it is difficult for a processor provided in a multifunction peripheral or the like to execute the pattern recognition process.

In addition, to increase the accuracy in determining the cause of the image defect, an extremely large size of teacher data is required for the learning of the learning model. However, it requires much labor and time for preparing a vast number of test images g1 in correspondence with possible combinations of a type of image defect and a cause of image defect for each model of the image forming device 2.

As described below, in the image defect determination process, the CPU 80 performs an image pattern recognition process in a manner to restrict the operation amount. This makes it possible to determine the cause of the image defect with high accuracy.

In the following description, images such as the test image g1 targeted to be processed by the CPU 80 are digital image data. The digital image data constitutes, for each of three primary colors, map data that includes a plurality of pixel values corresponding to a two-dimensional coordinate area in a main scanning direction D1 and a sub scanning direction D2 crossing the main scanning direction D1. The three primary colors are, for example, red, green, and blue. It is noted that the sub scanning direction D2 is perpendicular to the main scanning direction D1. It is noted that the main scanning direction D1 is a horizontal direction in the test image g1, and the sub scanning direction D2 is a vertical direction in the test image g1.

For example, the original test image g01 and the test image g1 are each a mixed-color halftone image that is a combination of a plurality of uniform single-color halftone images that correspond to the plurality of developing colors used in the image forming device 2. The plurality of single-color halftone images are each formed uniformly with a predetermined halftone reference density.

In the test print process, one test output sheet 9 including one original test image g01 is output. Accordingly, one test image g1 corresponding to the original test image g01 is a particular target for identifying the image defect.

In the present embodiment, the test image g1 is a mixed-color halftone image that is generated by combining four uniform single-color halftone images that correspond to all developing colors used in the image forming device 2. The test image g1 in the present embodiment is an example of a mixed-color test image.

In addition, the plurality of processing modules of the CPU 80 further include, for the execution of the image defect determination process, a feature image generating portion 8c, a specific part identifying portion 8d, a color vector identifying portion 8e, a periodicity determining portion 8f, a pattern recognizing portion 8g, and a random variation determining portion 8h (see FIG. 2).

[Image Defect Determination Process]

The following describes an example of a procedure of the image defect determination process with reference to the flowchart shown in FIG. 3. In the following description, S101, S102, . . . are identification signs representing a plurality of steps of the image defect determination process.

When the reading process is executed in response to the reading start operation performed on the operation portion 801 after the guide message is displayed on the display portion 802, the main control portion 8a causes the feature image generating portion 8c to execute step S101 of the image defect determination process.

<Step S101>

In step S101, the feature image generating portion 8c generates the test image g1 from the read image that was obtained in the image reading process performed on the test output sheet 9.

For example, the feature image generating portion 8c extracts, as the test image g1, an original image part from the read image, wherein the original image part is a part of the read image excluding a margin area at the outer edge.

Alternatively, the feature image generating portion 8c generates the test image g1 by performing a compression process to compress the original image part of the read image excluding the margin area at the outer edge to a predetermined reference resolution. When the resolution of the read image is higher than the reference resolution, the feature image generating portion 8c compresses the read image. After generating the test image g1, the main control portion 8a moves the process to step S102.

<Step S102>

In step S102, the feature image generating portion 8c starts a specific defect determination process that is described below. The specific defect determination process is performed to determine whether or not a specific part Ps1 such as the vertical stripe Ps11, the horizontal stripe Ps12, or the noise point Ps13 is present in the test image g1, and determine the cause of the specific part Ps1 (see FIG. 6). The specific part Ps1 is an example of the image defect. In addition, the test image g1 in the present embodiment is an example of a target test image that is a particular target for identifying the specific part Ps1.

Furthermore, when the specific defect determination process is completed, the main control portion 8a moves the process to step S103.

<Step S103>

In step S103, the periodicity determining portion 8f starts a density variation determination process that is described below. Furthermore, when the density variation determination process is completed, the main control portion 8a moves the process to step S104.

<Step S104>

In step S104, the main control portion 8a determines whether or not an image defect has occurred based on the processes of step S102 and step S103. Upon determining that an image defect has occurred, the main control portion 8a moves the process to step S105. Otherwise, the main control portion 8a moves the process to step S106.

<Step S105>

In step S105, the main control portion 8a executes a defect dealing process that had been preliminarily associated with the type and cause of the image defect that was determined to have occurred based on the process of step S102 or step S103.

For example, the defect dealing process includes either or both of a first dealing process and a second dealing process that are described below. The first dealing process is performed to display, on the display portion 802, a message that urges replacing a part that is the cause of the image defect. The second dealing process is performed to correct an image creation parameter so as to eliminate or alleviate the image defect. The image creation parameter is related to the control of the image creating portion 4x.

After executing the defect dealing process, the main control portion 8a ends the image defect determination process.

<Step S106>

On the other hand, in step S106, the main control portion 8a performs a normality notification to notify that no image defect was identified, and ends the image defect determination process.

[Specific Defect Determination Process]

Figure 4:
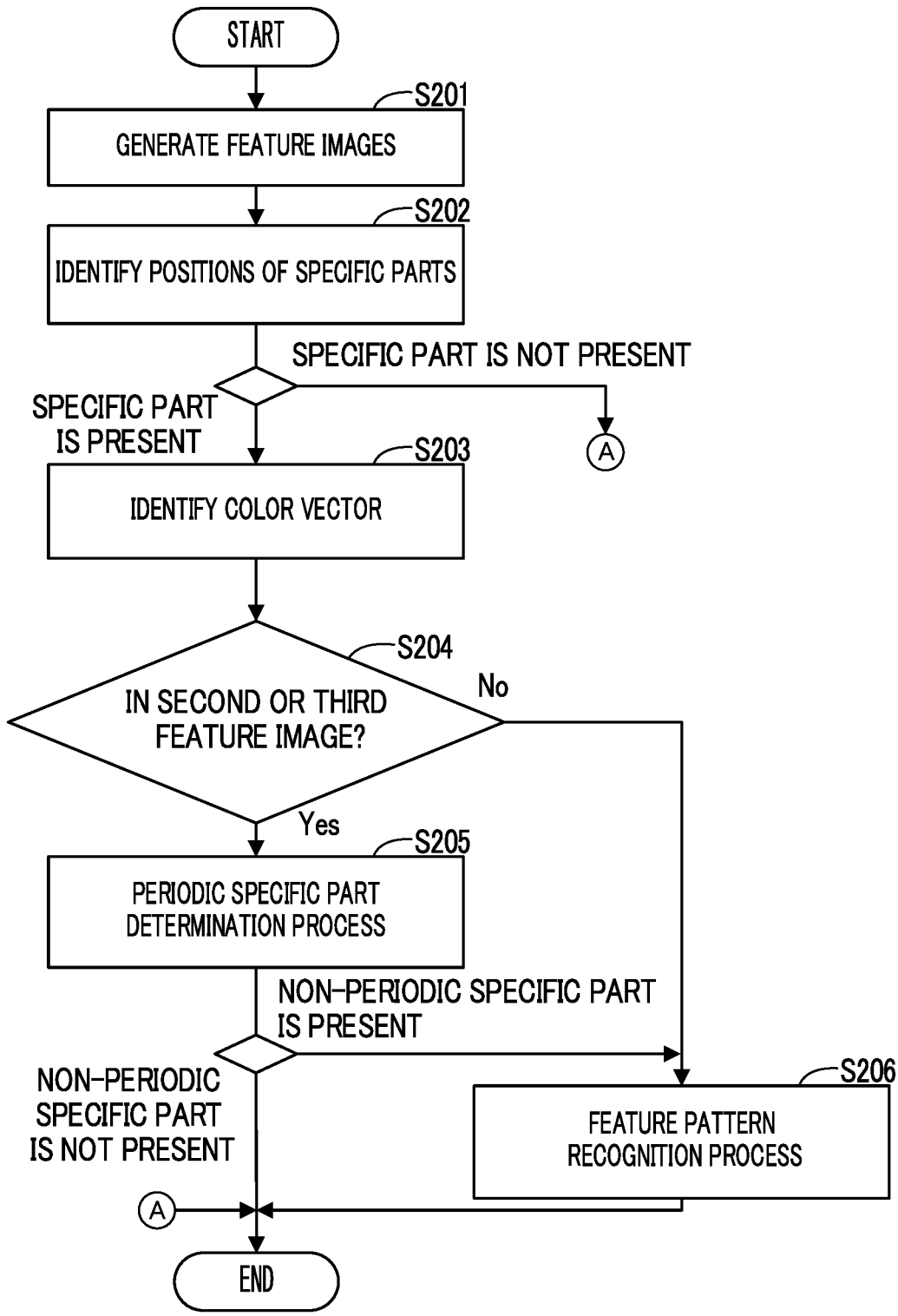
FIG. 4 is a flowchart showing an example of a procedure of a specific defect determination process in the image processing apparatus according to the embodiment.

Next, the following describes an example of a procedure of the specific defect determination process of step S102 with reference to the flowchart shown in FIG. 4. In the following description, S201, S202, . . . are identification signs representing a plurality of steps of the specific defect determination process. The specific defect determination process starts from step S201.

<Step S201>

First, in step S201, the feature image generating portion 8c generates a plurality of feature images g21, g22, and g23 by executing a predetermined feature extracting process on the test image g1. The plurality of feature images g21, g22, and g23 are images of specific parts Ps1 of predetermined particular types extracted from the test image g1.

In the present embodiment, the plurality of feature images g21, g22, and g23 include a first feature image g21, a second feature image g22, and a third feature image g23 (see FIG. 6).

The first feature image g21 is an image of the vertical stripe Ps11 extracted from the test image g1. The second feature image g22 is an image of the horizontal stripe Ps12 extracted from the test image g1. The third feature image g23 is an image of the noise point Ps13 extracted from the test image g1.

In the present embodiment, the feature extracting process includes a first pre-process, a second pre-process, and a specific part extracting process. In the following description, each of pixels that are sequentially selected from the test image g1 is referred to as a focused pixel Px1 (see FIG. 6, FIG. 7).

The feature image generating portion 8c generates a first pre-process image g11 by executing the first pre-process on the test image g1 using the main scanning direction D1 as a processing direction Dx1 (see FIG. 6).

Furthermore, the feature image generating portion 8c generates a second pre-process image g12 by executing the second pre-process on the test image g1 using the sub scanning direction D2 as the processing direction Dx1 (see FIG. 6).

Furthermore, the feature image generating portion 8c generates the three feature images g21, g22, and g23 by executing the specific part extracting process on the first pre-process image g11 and the second pre-process image g12.

The first pre-process includes a main filter process in which the processing direction Dx1 is the main scanning direction D1. In the main filter process, the pixel value of each of the focused pixels Px1 sequentially selected from the test image g1 is converted to a conversion value that is obtained by performing a process to emphasize the difference between a pixel value of a focused area Ax1 and a pixel value of two adjacent areas Ax2 that are adjacent to the focused area Ax1 (see FIG. 6, FIG. 7).

The focused area Ax1 includes the focused pixel Px1. The two adjacent areas Ax2 are adjacent to the focused area Ax1 from opposite sides in the processing direction Dx1 that is preliminarily set for the focused area Ax1. Each of the focused area Ax1 and the adjacent areas Ax2 includes one or more pixels.

The size of the focused area Ax1 and the adjacent areas Ax2 is set based on the width of the vertical stripe Ps11 or the horizontal stripe Ps12 to be extracted or the size of the noise point Ps13 to be extracted.

Each of the focused area Ax1 and the adjacent areas Ax2 occupies the same range in a direction crossing the processing direction Dx1. In the example shown in FIG. 7, the focused area Ax1 has 21 pixels of three columns and seven rows centered around the focused pixel Px1. Each of the adjacent areas Ax2 has 21 pixels of three columns and seven rows, too. In each of the focused area Ax1 and the adjacent areas Ax2, the number of rows is the number of lines along the processing direction Dx1, and the number of columns is the number of lines along a direction crossing the processing direction Dx1. The size of each of the focused area Ax1 and the adjacent areas Ax2 is preliminarily set.

In the main filter process, pixel values of pixels in the focused area Ax1 are converted to first correction values by using a predetermined first correction coefficient K1, and pixel values of pixels in the adjacent areas Ax2 are converted to second correction values by using a predetermined second correction coefficient K2.

For example, the first correction coefficient K1 is multiplied with each pixel value of the focused area Ax1 and is 1 (one) or greater, and the second correction coefficient K2 is multiplied with each pixel value of the adjacent areas Ax2 and is smaller than 0 (zero). In this case, the first correction coefficient K1 and the second correction coefficient K2 are set so that a sum of a value obtained by multiplying the first correction coefficient K1 by the number of pixels in the focused area Ax1 and a value obtained by multiplying the second correction coefficient K2 by the number of pixels in the two adjacent areas Ax2 becomes zero.

The feature image generating portion 8c derives the first correction values respectively corresponding to the pixels of the focused area Ax1 by multiplying the first correction coefficient K1 by each pixel value of the focused area Ax1, and derives the second correction values respectively corresponding to the pixels of the two adjacent areas Ax2 by multiplying the second correction coefficient K2 by each pixel value of the two adjacent areas Ax2. Subsequently, the feature image generating portion 8c derives, as the conversion value for the pixel value of each focused pixel Px1, a value by integrating the first correction value and the second correction value.

Furthermore, the feature image generating portion 8c derives the conversion value by adding: a total value or an average value of a plurality of first correction values corresponding to a plurality of pixels of the focused area Ax1; and a total value or an average value of a plurality of second correction values corresponding to a plurality of pixels of the two adjacent areas Ax2.

For example, the feature image generating portion 8c may generate, as the first pre-process image g11, first main map data that includes a plurality of conversion values that are obtained by performing the main filter process using the main scanning direction D1 as the processing direction Dx1.

As shown in FIG. 6, when the test image g1 includes either or both of the vertical stripe Ps11 and the noise point Ps13, the main filter process in which the processing direction Dx1 is the main scanning direction D1 generates the first main map data by extracting either or both of the vertical stripe Ps11 and the noise point Ps13 from the test image g1.

In addition, when the test image g1 includes the horizontal stripe Ps12, the main filter process in which the processing direction Dx1 is the main scanning direction D1 generates the first main map data by removing the horizontal stripe Ps12 from the test image g1.

It is noted that the vertical stripe Ps11 corresponds to the first specific part, the horizontal stripe Ps12 corresponds to the second specific part, and the noise point Ps13 corresponds to the third specific part.

On the other hand, the second pre-process includes the main filter process in which the processing direction Dx1 is the sub scanning direction D2.

For example, the feature image generating portion 8c may generate, as the second pre-process image g12, second main map data that includes a plurality of conversion values that are obtained by performing the main filter process using the sub scanning direction D2 as the processing direction Dx1.

As shown in FIG. 6, when the test image g1 includes either or both of the horizontal stripe Ps12 and the noise point Ps13, the main filter process in which the processing direction Dx1 is the sub scanning direction D2 generates the second main map data by extracting either or both of the horizontal stripe Ps12 and the noise point Ps13 from the test image g1.

In addition, when the test image g1 includes the vertical stripe Ps11, the main filter process in which the processing direction Dx1 is the sub scanning direction D2 generates the second main map data by removing the vertical stripe Ps11 from the test image g1.

However, the main filter process may derive erroneous conversion values that are reverse in positivity and negativity in edge portions at opposite ends of the specific part Ps1 in the processing direction Dx1 with respect to the conversion values indicating the status of the original specific part Ps1. When such erroneous conversion values are processed as pixel values indicating the specific part Ps1, the determination of the image defect may be adversely affected.

In view of the above, in the present embodiment, the first pre-process further includes an edge emphasizing filter process in which the processing direction Dx1 is the main scanning direction D1, in addition to the main filter process in which the processing direction Dx1 is the main scanning direction D1.

Similarly, the second pre-process further includes the edge emphasizing filter process in which the processing direction Dx1 is the sub scanning direction D2, in addition to the main filter process in which the processing direction Dx1 is the sub scanning direction D2.

In the edge emphasizing filter process, an edge emphasizing is performed on the focused area Ax1 and a predetermined one of the two adjacent areas Ax2.

Specifically, in the edge emphasizing filter process, the pixel value of each of the focused pixels Px1 sequentially selected from the test image g1 is converted to an edge intensity that is obtained by integrating a third correction value and a fourth correction value, wherein the third correction value is obtained by correcting the pixel value of each pixel in the focused area Ax1 by a positive or negative third correction coefficient K3, and the fourth correction value is obtained by correcting the pixel value of each pixel in one of the two adjacent areas Ax2 by a fourth correction coefficient K4 that is reverse to the third correction coefficient K3 in positivity and negativity (see FIG. 6).

In the example shown in FIG. 6, the third correction coefficient K3 is a positive coefficient and the fourth correction coefficient K4 is a negative coefficient. The third correction coefficient K3 and the fourth correction coefficient K4 are set so that a sum of a value obtained by multiplying the third correction coefficient K3 by the number of pixels in the focused area Ax1 and a value obtained by multiplying the fourth correction coefficient K4 by the number of pixels in the one of the two adjacent areas Ax2 becomes zero.

The execution of the edge emphasizing filter process by using the main scanning direction D1 as the processing direction Dx1 generates horizontal edge strength map data in which the pixel value of each pixel in the test image g1 has been converted to the edge strength.

Similarly, the execution of the edge emphasizing filter process by using the sub scanning direction D2 as the processing direction Dx1 generates vertical edge strength map data in which the pixel value of each pixel in the test image g1 has been converted to the edge strength.

In the present embodiment, the feature image generating portion 8c generates the first main map data by executing the main filter process using the main scanning direction D1 as the processing direction Dx1.

Furthermore, the feature image generating portion 8c generates the horizontal edge strength map data by executing the edge emphasizing filter process using the main scanning direction D1 as the processing direction Dx1.

Furthermore, the feature image generating portion 8c generates the first pre-process image g11 by correcting each pixel value of the first main map data by each corresponding pixel value of the horizontal edge strength map data. For example, the feature image generating portion 8c generates the first pre-process image g11 by adding an absolute value of each pixel value of the horizontal edge strength map data to each pixel value of the first main map data.

Similarly, the feature image generating portion 8c generates the second main map data by executing the main filter process using the sub scanning direction D2 as the processing direction Dx1.

Furthermore, the feature image generating portion 8c generates the vertical edge strength map data by executing the edge emphasizing filter process using the sub scanning direction D2 as the processing direction Dx1.

Furthermore, the feature image generating portion 8c generates the second pre-process image g12 by correcting each pixel value of the second main map data by each corresponding pixel value of the vertical edge strength map data. For example, the feature image generating portion 8c generates the second pre-process image g12 by adding an absolute value of each pixel value of the vertical edge strength map data to each pixel value of the second main map data.

In the specific part extracting process, the three feature images g21, g22, and g23 are generated by extracting the vertical stripe Ps11, the horizontal stripe Ps12, and the noise point Ps13 individually from the first pre-process image g11 or the second pre-process image g12. The three feature images g21, g22, and g23 are the first feature image g21, the second feature image g22, and the third feature image g23.

The first feature image g21 includes, among specific parts Ps1 which are each composed of one or more significant pixels and are present in the first pre-process image g11 and the second pre-process image g12, a specific part Ps1 that is present in the first pre-process image g11 and is not common to the first pre-process image g11 and the second pre-process image g12. The first feature image g21 does not include the horizontal stripe Ps12 and the noise point Ps13. In addition, when the first pre-process image g11 includes the vertical stripe Ps11, the first feature image g21 includes the vertical stripe Ps11.

It is noted that the significant pixels are distinguished from the other pixels in the test image g1 when each pixel value of the test image g1, or an index value based on each pixel value, is compared with a predetermined threshold.

The second feature image g22 includes, among the specific parts Ps1 that are present in the first pre-process image g11 and the second pre-process image g12, a specific part Ps1 that is present in the second pre-process image g12 and is not common to the first pre-process image g11 and the second pre-process image g12. The second feature image g22 does not include the vertical stripe Ps11 and the noise point Ps13. In addition, when the second pre-process image g12 includes the horizontal stripe Ps12, the second feature image g22 includes the horizontal stripe Ps12.

The third feature image g23 includes a specific part Ps1 that is common to the first pre-process image g11 and the second pre-process image g12. The third feature image g23 does not include the vertical stripe Ps11 and the horizontal stripe Ps12. In addition, when the first pre-process image g11 and the second pre-process image g12 include the noise point Ps13, the third feature image g23 includes the noise point Ps13.

There may be various methods for generating three feature images g21, g22, and g23 from the first pre-process image g11 and the second pre-process image g12.

For example, the feature image generating portion 8c derives an index value Zi by applying a first pixel value Xi and a second pixel value Yi to the following formula (1), wherein the first pixel value Xi represents each pixel value that exceeds a predetermined reference value in the first pre-process image g11, and the second pixel value Yi represents each pixel value that exceeds the reference value in the second pre-process image g12. Here, the subscription "i" denotes the position identification number of each pixel.

[Math 1]

$$Zi = \frac{|Xi| - |Yi|}{|Xi| + |Yi|} \qquad (1)$$

The index value Zi of each pixel constituting the vertical stripe Ps11 is a relatively large positive number. In addition, the index value Zi of each pixel constituting the horizontal stripe Ps12 is a relatively small negative number. In addition, the index value Zi of each pixel constituting the noise point Ps13 is 0 (zero) or a value close to 0 (zero). The index value Zi is an example of an index value of a difference between each pixel value of the first pre-process image g11 and each corresponding pixel value of the second pre-process image g12.

The above-mentioned nature of the index value Zi can be used to simplify the process of extracting the vertical stripe Ps11 from the first pre-process image g11, extracting the horizontal stripe Ps12 from the second pre-process image g12, and extracting the noise point Ps13 from the first pre-process image g11 or the second pre-process image g12.

For example, the feature image generating portion 8c generates the first feature image g21 by converting the first pixel value Xi in the first pre-process image g11 to a first specificity Pi that is derived by the following formula (2). This generates the first feature image g21 that includes the vertical stripe Ps11 extracted from the first pre-process image g11.

[Math 2]

$$Pi = XiZi \qquad (2)$$

Furthermore, the feature image generating portion 8c generates the second feature image g22 by converting the second pixel value Yi in the second pre-process image g12 to a second specificity Qi that is derived by the following formula (3). This generates the second feature image g22 that includes the horizontal stripe Ps12 extracted from the second pre-process image g12.

[Math 3]

$$Qi = Yi(-Zi) \qquad (3)$$

Furthermore, the feature image generating portion 8c generates the third feature image g23 by converting the first pixel value Xi in the first pre-process image g11 to a third specificity Ri that is derived by the following formula (4). This generates the third feature image g23 that includes the noise point Ps13 extracted from the first pre-process image g11.

[Math 4]

$$Ri = xi(1 - Zi) \qquad (4)$$

Alternatively, the feature image generating portion 8c may generate the third feature image g23 by converting the second pixel value Yi in the second pre-process image g12 to the third specificity Ri that is derived by the following formula (5). This generates the third feature image g23 that includes the noise point Ps13 extracted from the second pre-process image g12.

[Math 5]

$$Ri = Yi(Zi - 1) \qquad (5)$$

As described above, the feature image generating portion 8c generates the first feature image g21 by converting each pixel value in the first pre-process image g11 by a predetermined formula (2) that is based on the index value Zi. The formula (2) is an example of a first conversion formula.

Furthermore, the feature image generating portion 8c generates the second feature image g22 by converting each pixel value in the second pre-process image g12 by a predetermined formula (3) that is based on the index value Zi. The formula (3) is an example of a second conversion formula.

Furthermore, the feature image generating portion 8c generates the third feature image g23 by converting each pixel value in the first pre-process image g11 or the second pre-process image g12 by a predetermined formula (4) or formula (5) that is based on the index value Zi. The formula (4) and the formula (5) are each an example of a third conversion formula.

The process of step S201 in which the first feature image g21, the second feature image g22, and the third feature image g23 are generated is an example of a process in which the vertical stripe Ps11, the horizontal stripe Ps12, and the noise point Ps13 of the one or more specific parts Ps1 are extracted as the image defects from the first pre-process image g11 and the second pre-process image g12.

After generating the feature images g21, g22, and g23, the feature image generating portion 8c moves the process to step S202.

<Step S202>

In step S202, the specific part identifying portion 8d identifies the positions of the specific parts Ps1 in the feature images g21, g22, and g23. The processes of steps S201 and S202 are an example of a process to identify the specific part Ps1 that is composed of a plurality of significant pixels in the test image g1.

For example, the specific part identifying portion 8d determines, as the specific part Ps1, a part that includes a pixel value that is out of a predetermined reference range in the feature images g21, g22, and g23.

In addition, the specific part identifying portion 8d executes a coupling process to determine, for each of the feature images g21, g22, and g23, whether or not a plurality of specific parts Ps1 are present in a predetermined proximity range in the main scanning direction D1 or the sub scanning direction D2, and when such specific parts Ps1 are present, couple the specific parts Ps1 into one series of specific parts Ps1.

For example, when the first feature image g21 includes two vertical stripes Ps11 that are lined up in parallel at an interval in the sub scanning direction D2 in the proximity range, the specific part identifying portion 8d executes the coupling process to couple the two vertical stripes Ps11 into one vertical stripe Ps11.

Similarly, when the second feature image g22 includes two horizontal stripes Ps12 that are lined up in parallel at an interval in the main scanning direction D1 in the proximity range, the specific part identifying portion 8d executes the coupling process to couple the two horizontal stripes Ps12 into one horizontal stripe Ps12.

In addition, when the third feature image g23 includes a plurality of noise points Ps13 that are lined up in parallel at intervals in the main scanning direction D1 or in the sub scanning direction D2 in the proximity range, the specific part identifying portion 8d executes the coupling process to couple the plurality of noise points Ps13 into one noise point Ps13.

The specific part identifying portion 8d ends the specific defect determination process when it has failed to identify the positions of the specific parts Ps1 in the three feature images g21, g22, and g23. On the other hand, the specific part identifying portion 8d moves the process to step S203 when it has identified the positions of the specific parts Ps1 in one or more of the three feature images g21, g22, and g23.

<Step S203>

In step S203, the color vector identifying portion 8e identifies a color vector that represents a vector in a color space from one of a color of the specific part Ps1 in the test image g1 and a color of a reference area including the periphery of the specific part Ps1 to the other.

The reference area is an area of a predetermined range decided on the basis of the specific part Ps1. For example, the reference area includes a peripheral area adjacent to the specific part Ps1 and does not include the specific part Ps1. In addition, the reference area may include the specific part Ps1 and a peripheral area adjacent to the specific part Ps1.

The test image g1 is originally a uniform halftone image. As a result, when an excellent test image g1 is formed on the test output sheet 9, the specific part Ps1 is not identified, and the color vector at any position in the test image g1 is approximately zero vector.

On the other hand, when the specific part Ps1 is identified, the direction of the color vector between the specific part Ps1 and the reference area corresponding to the specific part Ps1 indicates an excess or a shortage of the toner density in any of the four developing colors in the image forming device 2.

Accordingly, the direction of the color vector indicates, as the cause of the specific part Ps1, any of the four image creating portions 4x in the image forming device 2.

It is noted that the color vector identifying portion 8e may identify, as the color vector, a vector in a color space from one of a color of the specific part Ps1 in the test image g1 and a predetermined reference color to the other. In this case, the reference color is the original color of the test image g1.

In step S203, the color vector identifying portion 8e, based on the color vector, further determines a developing color that is the cause of the specific part Ps1, and the excess/shortage state of the density of the developing color.

For example, the secondary storage device 82 preliminarily stores information of a plurality of unit vectors that indicate, for each of cyan, magenta, yellow, and black, the directions in which the density increases and decreases with respect to the reference color of the test image g1.

The color vector identifying portion 8e normalizes the color vector to a predetermined unit length. Furthermore, the color vector identifying portion 8e determines a developing color that is the cause of the specific part Ps1 and the excess/shortage state of the density of the developing color by determining which of a plurality of unit vectors corresponding to the increase or the decrease of the density of cyan, magenta, yellow, or black approximates most closely to the color vector after the normalization.

After executing the process of step S203, the color vector identifying portion 8e moves the process to step S204.

<Step S204>

In step S204, the periodicity determining portion 8f moves the process to step S205 when the specific part Ps1 has been identified in either or both of the second feature image g22 and the third feature image g23. Otherwise, the periodicity determining portion 8f moves the process to step S206.

In the following description, either or both of the second feature image g22 and the third feature image g23 in which the specific part Ps1 has been identified is referred to as a periodicity determination target image. The specific part Ps1 in the periodicity determination target image is the horizontal stripe Ps12 or the noise point Ps13 (see FIG. 6).

<Step S205>

In step S205, the periodicity determining portion 8f executes a periodic specific part determination process on the periodicity determination target image. The periodic specific part determination process includes a number determination process, a specific part periodicity determination process, and a specific part periodicity cause determination process.

In the number determination process, the number of specific parts Ps1 that are lined up in the sub scanning direction D2 in the periodicity determination target image is determined.

Specifically, the periodicity determining portion 8f determines the number of horizontal stripes Ps12 that are lined up in the sub scanning direction D2, by counting, in the second feature image g22, the number of horizontal stripes Ps12 lined up in the sub scanning direction D2 in which parts occupying the same range in the main scanning direction D1 exceed a predetermined ratio.

Furthermore, the periodicity determining portion 8f determines the number of noise points Ps13 lined up in the sub scanning direction D2, by counting the number of noise points Ps13, whose positional shift in the main scanning direction D1 is within a predetermined range, that are lined up in the sub scanning direction D2 in the third feature image g23.

The periodicity determining portion 8f executes the specific part periodicity determination process only on two or more specific parts Ps1 that are lined up in the sub scanning direction D2.

In addition, the periodicity determining portion 8f determines that one specific part Ps1 lined up in the sub scanning direction D2 does not have periodicity, and skips the specific part periodicity determination process and the specific part periodicity cause determination process for such specific part Ps1.

In the specific part periodicity determination process, it is determined whether or not the periodicity determination target image has one or more predetermined periodicities in the sub scanning direction D2.

The periodicity corresponds to the outer peripheral length of the rotating bodies related to the image creation, such as the photoconductor 41, the charging roller 42a, the developing roller 43a, or the primary transfer rollers 441, in each of the image creating portions 4x and the transfer device 44. The state of the rotating bodies related to the image creation influences the quality of the image formed on the sheet. In the following description, the rotating bodies related to the image creation are referred to as image creation rotating bodies.

When the image defect occurs due to a defect of one of the image creation rotating bodies, the periodicity corresponding to the outer peripheral length of the image creation rotating body may appear as an interval in the sub scanning direction D2 between a plurality of horizontal stripes Ps12 or a plurality of noise points Ps13.

Accordingly, in a case where the periodicity determination target image has the periodicity corresponding to the outer peripheral length of an image creation rotating body, it can be said that the image creation rotating body corresponding to the periodicity is the cause of the horizontal stripes Ps12 or the noise points Ps13 in the periodicity determination target image.

When the number of specific parts Ps1 lined up in the sub scanning direction D2 in the periodicity determination target image is 2 (two), the periodicity determining portion 8f executes an interval deriving process as the specific part periodicity determination process.

In the interval deriving process, the periodicity determining portion 8f derives an interval between two specific parts Ps1 in the sub scanning direction D2 as the period of the two specific parts Ps1.

When the number of specific parts Ps1 lined up in the sub scanning direction D2 in the periodicity determination target image is 3 (three) or more, the periodicity determining portion 8f executes a frequency analyzing process as the specific part periodicity determination process.

In the frequency analyzing process, the periodicity determining portion 8f identifies a specific part frequency by performing a frequency analysis such as the Fourier transformation on the periodicity determination target image that includes three or more specific parts Ps1 lined up in the sub scanning direction D2, wherein the specific part frequency is a dominant frequency in a frequency distribution of a data sequence of the specific part Ps1 in the periodicity determination target image.

Furthermore, the periodicity determining portion 8f derives, as the period of the three or more specific parts Ps1, a period corresponding to the specific part frequency.

In addition, in the specific part periodicity cause determination process, the periodicity determining portion 8f determines, for each of a plurality of predetermined candidates for image creation rotating body, whether or not the outer peripheral length of each candidate satisfies a predetermined period approximate condition with respect to the period of the specific part Ps1. The plurality of candidates for image creation rotating body in step S205 is an example of a plurality of predetermined cause candidates corresponding to the horizontal stripe Ps12 or the noise point Ps13.

In the following description, among the specific parts Ps1 included in the second feature image g22 and the third feature image g23, a specific part Ps1 corresponding to any one of the candidates for image creation rotating body that was determined to satisfy the period approximate condition is referred to as a periodic specific part, and the other specific parts Ps1 are referred to as non-periodic specific parts.

In the specific part periodicity cause determination process, the periodicity determining portion 8f determines that one of the candidates for image creation rotating body that was determined to satisfy the period approximate condition is the cause of the periodic specific part. This determines the cause of the horizontal stripe Ps12 or the noise point Ps13.

In addition, in step S205, the periodicity determining portion 8f determines, based on the color vector determined in step S203, which of the image creation rotating bodies of the four image creating portions 4x of different developing colors is the cause of the horizontal stripe Ps12 or the noise point Ps13.

In addition, when three or more specific parts Ps1 lined up in the sub scanning direction D2 include a non-periodic specific part that does not correspond to the specific part frequency, the periodicity determining portion 8f selects the non-periodic specific part as a target of a feature pattern recognition process that is described below.

For example, the periodicity determining portion 8f generates inverse Fourier transformation data by applying an inverse Fourier transformation to the frequency distribution obtained by the Fourier transformation from which frequency components other than the specific part frequency have been removed.

Furthermore, the periodicity determining portion 8f identifies, as a non-periodic specific part, a specific part Ps1 that is, among three or more specific parts Ps1 lined up in the sub scanning direction D2, located at a position out of a peak position in the waveform in the sub scanning direction D2 indicated by the inverse Fourier transformation data.

In addition, upon determining, as a result of the process of step S205, that the second feature image g22 and the third feature image g23 do not include the non-periodic specific part, the periodicity determining portion 8f ends the specific defect determination process.

On the other hand, upon determining, as a result of the process of step S205, that the second feature image g22 and the third feature image g23 include the non-periodic specific part, the periodicity determining portion 8f moves the process to step S206.

<Step S206>

In step S206, the pattern recognizing portion 8g executes the feature pattern recognition process on the first feature image g21 and each of the second feature image g22 and the third feature image g23 that each include the non-periodic specific part. The second feature image g22 including the non-periodic specific part or the third feature image g23 including the non-periodic specific part is an example of a non-periodic feature image.

In the feature pattern recognition process, the first feature image g21 and the second feature image g22 and the third feature image g23 that each include the non-periodic specific part are treated as input images. In the feature pattern recognition process, the pattern recognizing portion 8g performs a pattern recognition on each input image to determine which of a plurality of predetermined cause candidates corresponding to the image defects corresponds to the input image.

In addition, the input image of the feature pattern recognition process may include the horizontal edge strength map data or the vertical edge strength map data obtained in the edge emphasizing filter process. For example, in the feature pattern recognition process to determine the vertical stripe Ps11, the first feature image g21 and the horizontal edge strength map data may be used as the input image.

Similarly, in the feature pattern recognition process to determine the horizontal stripe Ps12, the second feature image g22 and the vertical edge strength map data may be used as the input image.

Similarly, in the feature pattern recognition process to determine the noise point Ps13, the third feature image g23 and either or both of the horizontal edge strength map data and the vertical edge strength map data may be used as the input image.

For example, in the feature pattern recognition process, an input image is classified into one of the plurality of cause candidates based on a learning model that has been preliminarily learned using, as teacher data, a plurality of sample images corresponding to the plurality of cause candidates.

For example, a classification-type machine learning algorithm called random forests, a machine learning algorithm called SVM (Support Vector Machine), or a CNN (Convolutional Neural Network) algorithm may be adopted in the learning model.

The learning model is prepared individually for each of the first feature image g21 and each of the second feature image g22 and the third feature image g23 that each include the non-periodic specific part. In addition, the plurality of sample images are used as the teacher data for each of the cause candidates.

In addition, in step S206, the pattern recognizing portion 8g determines which of the four image creating portions 4x having different developing colors is the cause of the vertical stripe Ps11, the horizontal stripe Ps12, or the noise point Ps13 based on the color vector identified in step S203.

In step S206, the cause of the vertical stripe Ps11 and the cause of the horizontal stripe Ps12 and the noise point Ps13 that were identified as the non-periodic specific parts are determined. After executing the process of step S206, the pattern recognizing portion 8g ends the specific defect determination process.

[Density Variation Determination Process]

Figure 5:
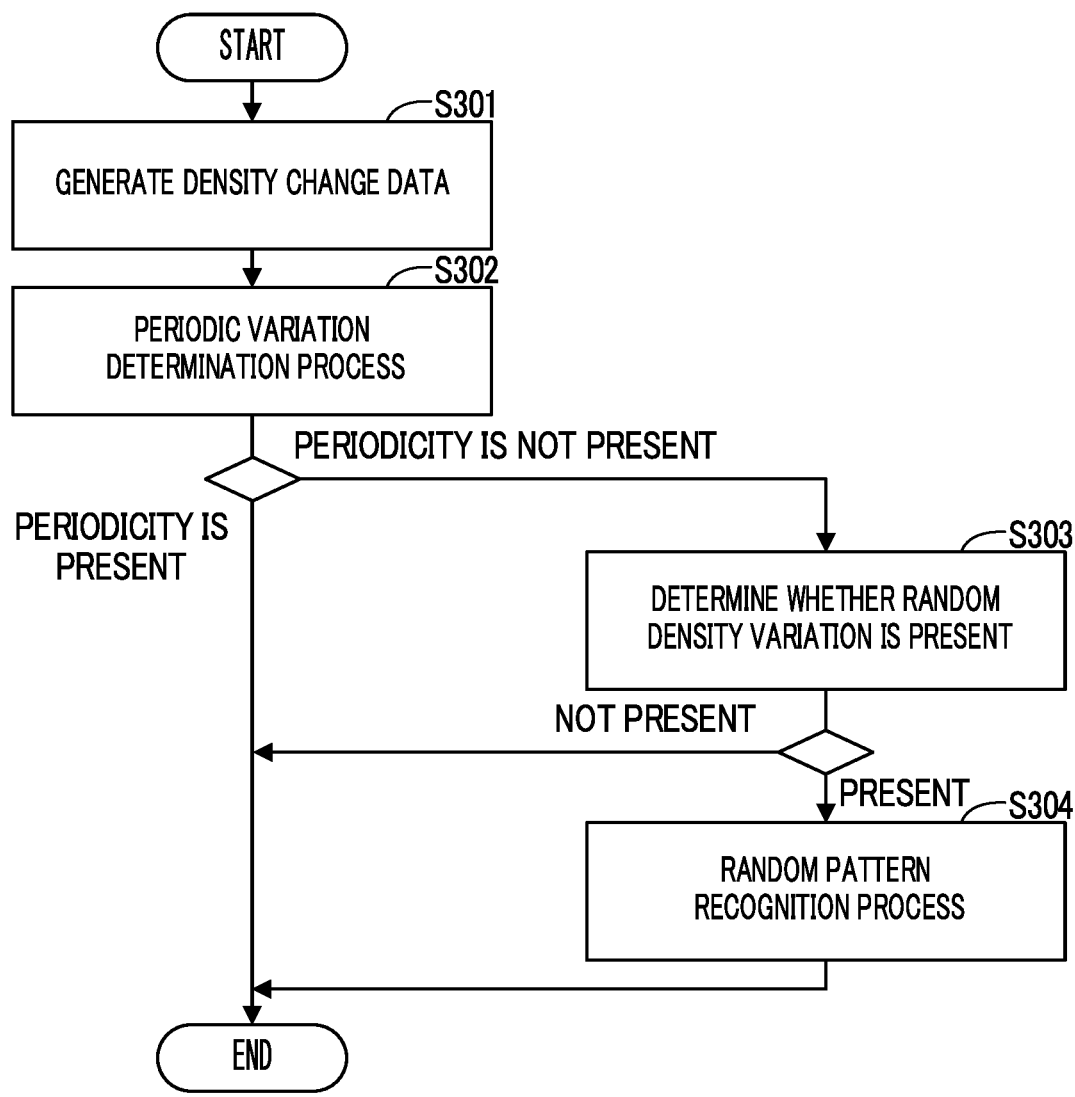
FIG. 5 is a flowchart showing an example of a procedure of a density variation determination process in the image processing apparatus according to the embodiment.

Next, the following describes an example of a procedure of the density variation determination process of step S103 with reference to the flowchart shown in FIG. 5. In the following description, S301, S302, . . . are identification signs representing a plurality of steps of the density variation determination process. The density variation determination process starts from step S301.

<Step S301>

Figure 8:
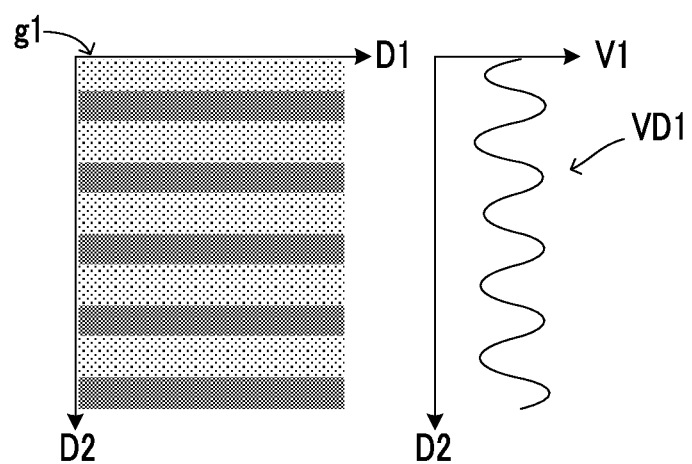
FIG. 8 is a diagram showing an example of a test image including periodic density variation and longitudinal waveform data derived based on the test image.

First, in step S301, the periodicity determining portion 8f derives a vertical data sequence VD1 for each of predetermined particular colors from the test image g1. The particular colors correspond to developing colors used in the image forming device 2. The vertical data sequence VD1 is composed of representative values V1 that are each a representative value of a plurality of pixel values of each line along the main scanning direction D1 in images of the particular colors constituting the test image g1 (see FIG. 8).

For example, the particular colors are three colors among the four developing colors used in the image forming device 2. In this case, the periodicity determining portion 8f converts red, green, and blue image data constituting the test image g1 into cyan, yellow, and magenta image data.

Subsequently, the periodicity determining portion 8f derives three vertical data sequences VD1 corresponding to cyan, yellow, and magenta by deriving representative values V1 that are each a representative value of a plurality of pixel values of each line along the main scanning direction D1, for each of image data of the three particular colors corresponding to the test image g1.

It is noted that the particular colors may be three primary colors: red, green, and blue. In this case, the periodicity determining portion 8f converts pixel values of three pieces of image data of red, green, and blue of the test image g1 into values that each represent a ratio to the average value or the total value of the pixel values of three pieces of image data of red, green, and blue in the test image g1. Furthermore, the periodicity determining portion 8f derives three vertical data sequences VD1 from the three pieces of converted image data.

Here, red corresponds to cyan, green corresponds to magenta, and blue corresponds to yellow. That is, cyan density variation appears as density variation in the converted red image data, magenta density variation appears as density variation in the converted green image data, and yellow density variation appears as density variation in the converted blue image data.

For example, the representative value V1 is an average value, a maximum value, or a minimum value of pixel values that remain when pixel values of the specific part Ps1 are removed from all pixel values of a line along the main scanning direction D1. In addition, the representative value V1 may be an average value, a maximum value, or a minimum value of all pixel values of a line along the main scanning direction D1.

After executing the process of step S301, the periodicity determining portion 8f moves the process to step S302.

<Step S302>

In step S302, the periodicity determining portion 8f executes a periodic variation determination process on the vertical data sequence VD1 for each of the particular colors.

For example, the periodicity determining portion 8f identifies a density variation frequency by performing a frequency analysis such as the Fourier transformation on each of the vertical data sequences VD1, wherein the density variation frequency is a dominant frequency in the frequency distribution of the vertical data sequence VD1.

Furthermore, the periodicity determining portion 8f derives, as a period of the density variation in the test image g1, a period that corresponds to the density variation frequency.

Furthermore, the periodicity determining portion 8f determines, for each of a plurality of predetermined candidates for image creation rotating body, whether or not the outer peripheral length of each candidate satisfies the period approximate condition with respect to the period of the density variation. When it is determined that any of the plurality of predetermined candidates for image creation rotating body satisfies the period approximate condition, it means that it is determined that a periodic density variation has occurred in the test image g1.

The plurality of candidates for image creation rotating body in step S302 is an example of a plurality of predetermined cause candidates corresponding to the periodic density variation. The periodic density variation is an example of the image defect.

Furthermore, the periodicity determining portion 8f determines the cause of the periodic density variation based on: a developing color corresponding to the vertical data sequence VD1; and a candidate for image creation rotating body that was determined as satisfying the period approximate condition.

However, when the periodic density variation occurs due to a black image creating portion 4x, a pixel value variation occurs in all pieces of image data of red, green, and blue constituting the test image g1.

As a result, upon determining that a periodic density variation with periodicity that is common to all of cyan, magenta, and yellow has occurred, the periodicity determining portion 8f determines that the black image creating portion 4x is the cause of the periodic density variation.

Upon determining that the periodic density variation has occurred in the test image g1, the periodicity determining portion 8f ends the density variation determination process. Otherwise, the periodicity determining portion 8f moves the process to step S303.

<Step S303>

In step S303, the random variation determining portion 8h determines whether or not a random density variation has occurred for each piece of image data of the three particular colors corresponding to the test image g1. The random density variation is a type of image defect.

The random variation determining portion 8h determines whether or not the random density variation has occurred, by determining whether or not a pixel value variation exceeds a predetermined permissible range for each piece of image data of the three particular colors.

For example, the size of the pixel value variation is determined by the dispersion, the standard deviation, or differences between the median value and the maximum value and the minimum value in each piece of image data of the four developing colors.

However, upon determining that the random density variation has occurred in all of cyan, magenta, and yellow, the periodicity determining portion 8f determines that the cause of the random density variation is the black image creating portion 4x.

Upon determining that the random density variation has occurred in the test image g1, the random variation determining portion 8h moves the process to step S304. Otherwise, the random variation determining portion 8h ends the density variation determination process.

<Step S304>

In step S304, the pattern recognizing portion 8g executes a random pattern recognition process. In the random pattern recognition process, the pattern recognizing portion 8g performs a pattern recognition on the input image that is the test image g1 for which it was determined that the random density variation had occurred, to determine which of one or more cause candidates corresponds to the input image.

After executing the process of step S304, the pattern recognizing portion 8g ends the density variation determination process.

The execution, by the CPU 80, of the image defect determination process that includes the specific defect determination process and the density variation determination process is an example of an image processing method in which a cause of an image defect is determined based on the test image g1 read from a sheet output from the image forming device 2.

As described above, the feature image generating portion 8c generates the first pre-process image g11 by executing the first pre-process including the main filter process using the horizontal direction of the test image g1 as the processing direction Dx1. In the main filter process, the pixel value of each of the focused pixels Px1 sequentially selected from the test image g1 is converted to a conversion value that is obtained by performing a process to emphasize the difference between a pixel value of the focused area Ax1 and a pixel value of two adjacent areas Ax2 that are adjacent to the focused area Ax1 from opposite sides in the processing direction Dx1 that is preliminarily set for the focused area Ax1 (see step S201 of FIG. 4, FIG. 6).

Furthermore, the feature image generating portion 8c generates the second pre-process image g12 by executing the second pre-process including the main filter process using the vertical direction of the test image g1 as the processing direction Dx1 (see step S201 of FIG. 4, FIG. 6).

Furthermore, the feature image generating portion 8c extracts, as the image defects, the vertical stripe Ps11, the horizontal stripe Ps12, and the noise point Ps13 of the one or more specific parts Ps1 in the first pre-process image g11 and the second pre-process image g12 (see step S201 of FIG. 4, FIG. 6). Specifically, the feature image generating portion 8c generates the first feature image g21, the second feature image g22, and the third feature image g23 in step S201.

The first feature image g21 includes, among specific parts Ps1 which are each composed of a plurality of significant pixels in the first pre-process image g11 and the second pre-process image g12, a specific part Ps1 that is present in the first pre-process image g11 and is not common to the first pre-process image g11 and the second pre-process image g12 (see FIG. 6).

The second feature image g22 includes, among the specific parts Ps1 in the first pre-process image g11 and the second pre-process image g12, a specific part Ps1 that is present in the second pre-process image g12 and is not common to the first pre-process image g11 and the second pre-process image g12 (see FIG. 6).

The third feature image g23 includes a specific part Ps1 that is common to the first pre-process image g11 and the second pre-process image g12 (see FIG. 6).

It is noted that the process of step S201 is an example of a process in which a plurality of first feature images g21, g22, and g23 are generated by executing the predetermined feature extracting process on the test image g1. The feature extracting process includes the first pre-process, the second pre-process, and the specific part extracting process.

The feature extracting process is a simple process with a small operation load. Such a simple process makes it possible to generate three feature images g21, g22, and g23 that respectively include specific parts Ps1 of different shapes that are extracted from one test image g1.

The periodicity determining portion 8f and the pattern recognizing portion 8g determine the causes of the vertical stripe Ps11, the horizontal stripe Ps12, and the noise point Ps13 that are different types of image defects, by executing the periodic specific part determination process and the feature pattern recognition process using the first feature image g21, the second feature image g22, and the third feature image g23 (see steps S205 and S206 of FIG. 4, FIG. 6).

The determination of the causes of the image defects is performed individually on the three feature images g21, g22, and g23 that respectively include the specific parts Ps1 of different types. This makes it possible to determine the causes of the image defects with high accuracy by executing a relatively simple determination process.

In the periodic specific part determination process of step S205, it is determined whether or not one or more predetermined periodicities are present along the sub scanning direction D2 in the second feature image g22 or the third feature image g23, and the cause of the horizontal stripe Ps12 or the noise point Ps13 is determined based on the result of the determination concerning periodicity.

When the horizontal stripe Ps12 or the noise point Ps13 occurs due to a defect of a rotating body related to the image creation, it is possible to determine the cause of the horizontal stripe Ps12 or the noise point Ps13 with high accuracy by executing the periodic specific part determination process to determine the periodicity corresponding to the outer peripheral length of the rotating body.

In addition, in the feature pattern recognition process of step S206, a pattern recognition is performed on each of input images to determine which of a plurality of predetermined cause candidates corresponding to the vertical stripe, the horizontal stripe, and the noise point corresponds to the input image. Here, the input images of step S206 are the first feature image g21 and any of the second feature image g22 and the third feature image g23 for which it was determined in the periodic specific part determination process that the periodicity is not present (see steps S204 to S206 of FIG. 4).

The periodic specific part determination process of step S205 and the feature pattern recognition process of step S206 are an example of a predetermined cause determination process in which the first feature image g21, the second feature image g22, and the third feature image g23 are used.

The feature pattern recognition process using the learning model or the like is executed for each of the feature images g21, g22, and g23 that respectively include specific parts Ps1 of particular types. This makes it possible to determine the causes of the image defects with high accuracy while restricting the operation amount of the CPU 80. In addition, the learning model for each type of the specific part Ps1 can be learned sufficiently with a relatively small amount of teacher data prepared for the specific part Ps1 of each of the particular types.

In addition, the feature pattern recognition process of step S206 is executed on, among the plurality of feature images g21, g22, and g23, the first feature image g21 on which the periodic specific part determination process of step S205 was not performed, and any of the second feature image g22 and the third feature image g23 for which it was determined in the periodic specific part determination process of step S205 that the periodicity is not present (see steps S204 to S206 of FIG. 4).

With the above-described configuration, in the feature pattern recognition process, it is possible to remove the possibility that the cause of the image defect corresponds to the periodicity of a rotating body related to the image creation. This makes the feature pattern recognition process simpler.

In addition, the color vector identifying portion 8e identifies a color vector that represents a vector in a color space from one of a color of the specific part Ps1 in the test image g1 and a color of a reference area including the periphery of the specific part Ps1 to the other (see step S203 of FIG. 4).

In the cause determination process, the periodicity determining portion 8f in step S205 and the pattern recognizing portion 8g in step S206 determine the causes of the vertical stripe Ps11, the horizontal stripe Ps12, and the noise point Ps13 by further using the color vector. That is, the periodicity determining portion 8f and the pattern recognizing portion 8g determine, based on the color vector, which of the plurality of image creating portions 4x corresponding to the plurality of developing colors used in the image forming device 2, is the cause of the image defect.

In the image forming device 2 configured to print a color image, using the color vector makes it possible to determine easily and in a reliable manner which of a plurality of parts that correspond to the plurality of developing colors, is the cause of the image defect. Furthermore, it is possible to determine the cause of the image defect based on the test output sheets 9 whose number is smaller than the total number of the developing colors used in the image forming device 2.

In addition, the periodicity determining portion 8f executes the periodic variation determination process for each of the predetermined particular colors with respect to the test image g1 (see steps S301 and S302 of FIG. 5). In the periodic variation determination process, it is determined whether or not one or more periodicities are present along the sub scanning direction D2, and it is determined, based on the result of the determination concerning periodicity, whether or not the periodic density variation that is a type of image defect, has occurred, and the cause of the periodic density variation is determined based on the result of the determination concerning periodicity.

The execution of the periodic variation determination process makes it possible to determine the cause of the periodic density variation with high accuracy.

In addition, the random variation determining portion 8h determines, with respect to the test image g1 for which it was determined in the periodic specific part determination process of step S302 that the periodicity is not present, whether or not the random density variation has occurred, by determining, for each of the particular colors, whether or not a pixel value variation exceeds a predetermined permissible range (see step S303 of FIG. 5). The random density variation is a type of image defect.

In addition, the pattern recognizing portion 8g executes the random pattern recognition process by using, as the input image, the test image g1 for which it was determined that the random density variation has occurred (see step S304 of FIG. 5). In the random pattern recognition process, a pattern recognition is performed on the input image to determine which of one or more cause candidates corresponds to the input image.

In addition, the test image g1 is a mixed-color halftone image that is generated by combining a plurality of uniform single-color halftone images that correspond to the plurality of developing colors used in the image forming device 2. With this configuration, the CPU 80 determines the causes of the image defects with regards to all the developing colors used in the image forming device 2 by using test images g1 whose number is smaller than the number of the developing colors used in the image forming device 2.

First Application Example

Figure 9:
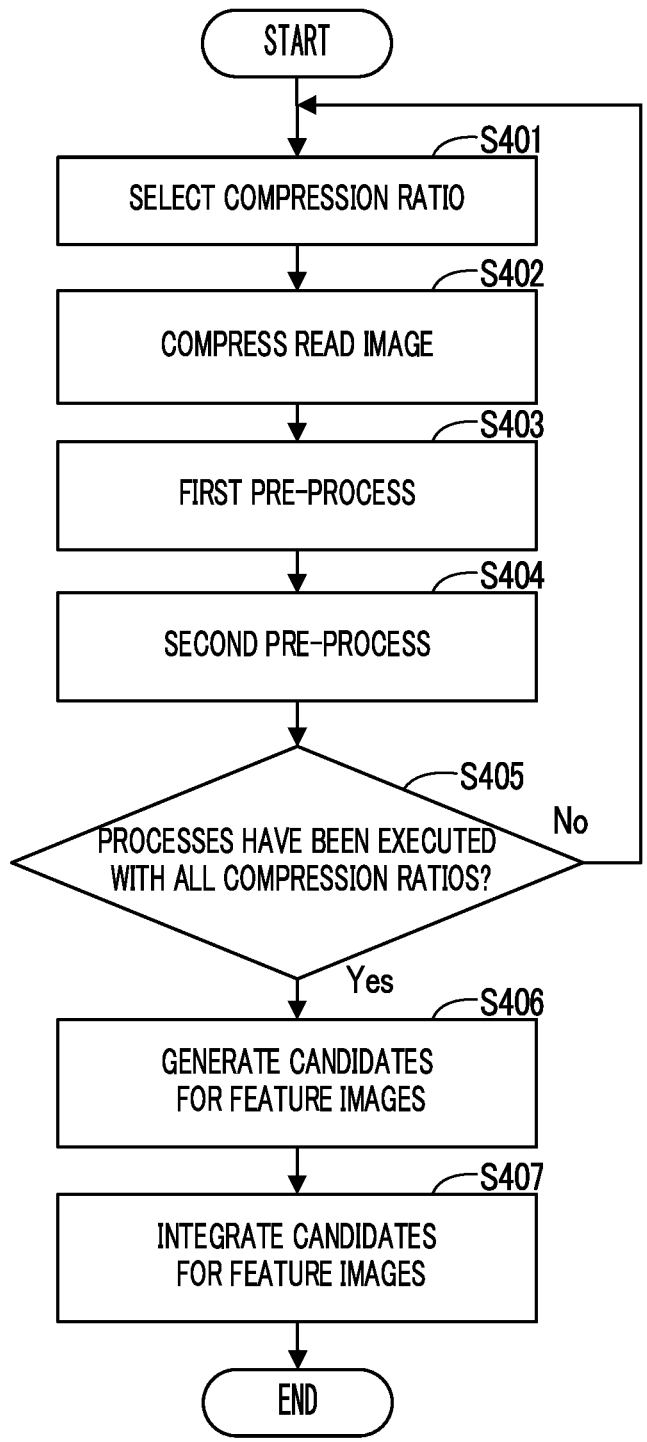
FIG. 9 is a flowchart showing an example of a procedure of a feature image generating process in a first application example of the image processing apparatus according to the embodiment.

Next, the following describes an example of a procedure of a feature image generating process according to a first application example of the image processing apparatus 10 with reference to the flowchart shown in FIG. 9.

In the following description, S401, S402, . . . are identification signs representing a plurality of steps of the feature image generating process of the present application example. The feature image generating process of the present application example starts from step S401.

<Step S401>

In step S401, the feature image generating portion 8c selects, from a plurality of predetermined compression ratio candidates, a compression ratio to be adopted and moves the process to step S402.

<Step S402>

In step S402, the feature image generating portion 8c generates the test image g1 by compressing the read image with the selected compression ratio. The processes of steps S401 and S402 are an example of a compression process. Thereafter, the feature image generating portion 8c moves the process to step S403.

<Step S403>

In step S403, the feature image generating portion 8c generates the first pre-process image g11 by executing the first pre-process on the compressed test image g1 obtained in step S401. Thereafter, the feature image generating portion 8c moves the process to step S404.

<Step S404>

In step S404, the feature image generating portion 8c generates the second pre-process image g12 by executing the second pre-process on the compressed test image g1 obtained in step S401. Thereafter, the feature image generating portion 8c moves the process to step S405.

<Step S405>

In step S405, upon determining that the processes of steps S401 to S404 have been executed with all of the plurality of compression ratio candidates, the feature image generating portion 8c moves the process to step S406. Otherwise, the feature image generating portion 8c executes the processes of steps S401 to S404 with a different compression ratio.

In the compression process of steps S401 and S402, the feature image generating portion 8c generates a plurality of test images g1 of different sizes by compressing the read image with a plurality of different compression ratios.

Furthermore, in steps S403 and S404, the feature image generating portion 8c generates a plurality of first pre-process images g11 and a plurality of second pre-process images g12 that respectively correspond to the plurality of test images g1 by executing the first pre-process and the second pre-process on the plurality of test images g1.

<Step S406>

In step S406, the feature image generating portion 8c executes the specific part extracting process on each of the plurality of first pre-process images g11 and the plurality of second pre-process images g12. This allows the feature image generating portion 8c to generate a plurality of candidates for each of the first feature image g21, the second feature image g22, and the third feature image g23 corresponding to the plurality of test images g1. Thereafter, the feature image generating portion 8c moves the process to step S407.

<Step S407>

In step S407, the feature image generating portion 8c generates the first feature image g21, the second feature image g22, and the third feature image g23 by integrating the plurality of candidates obtained in step S406. Thereafter, the feature image generating portion 8c ends the feature image generating process.

For example, the feature image generating portion 8c sets, as each pixel value of the first feature image g21, a representative value such as the maximum value or the average value of the pixel values of the plurality of candidates for the first feature image g21. This also applies to the second feature image g22 and the third feature image g23.

The processes of steps S401 to S404 are an example of a process to generate a plurality of first pre-process images g11 and a plurality of second pre-process images g12 by executing the first pre-process and the second pre-process multiple times with different size ratios of the size of the test image g1 to that of the focused area Ax1 and the adjacent areas Ax2. Changing the compression ratio is an example of changing the size ratio of the size of the test image g1 to that of the focused area Ax1 and the adjacent areas Ax2.

In addition, the processes of steps S406 to S407 are an example of a process to generate the first feature image g21, the second feature image g22, and the third feature image g23 by performing the specific part extracting process based on the plurality of first pre-process images g11 and the plurality of second pre-process images g12.

With the adoption of the present application example, it is possible to extract, without omission, the vertical stripes Ps11 or the horizontal stripes Ps12 of different thicknesses, or the noise points Ps13 of different sizes.

Second Application Example

Figure 10:
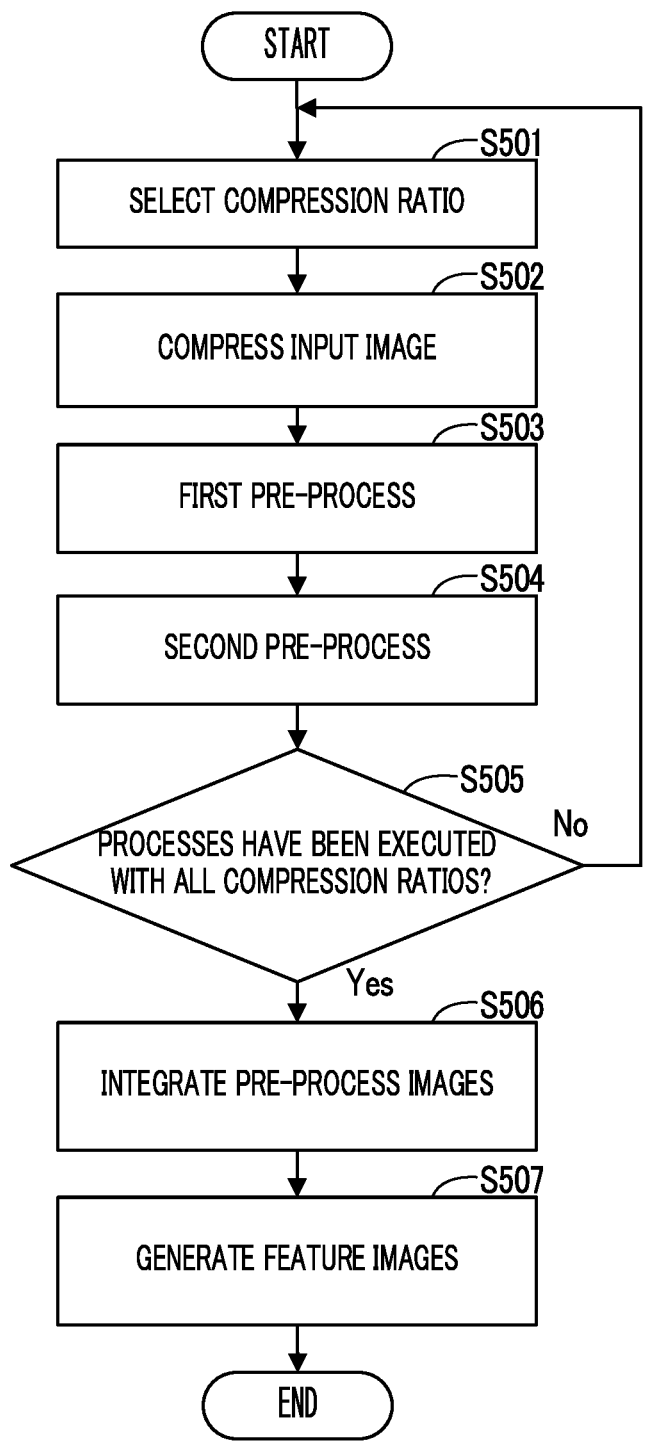
FIG. 10 is a flowchart showing an example of a procedure of the feature image generating process in a second application example of the image processing apparatus according to the embodiment.

Next, the following describes an example of a procedure of the feature image generating process according to a second application example of the image processing apparatus 10 with reference to the flowchart shown in FIG. 10.

In the following description, S501, S502, . . . are identification signs representing a plurality of steps of the feature image generating process of the present application example. The feature image generating process of the present application example starts from step S501.

<Steps S501 to S505>

The feature image generating portion 8c executes the processes of steps S501 to S505 that are the same as those of steps S401 to S405. In step S505, upon determining that the processes of steps S501 to S504 have been executed with all of the plurality of compression ratio candidates, the feature image generating portion 8c moves the process to step S506.

<Step S506>

In step S506, the feature image generating portion 8c integrates the plurality of first pre-process images g11 into one and integrates the plurality of second pre-process images g12 into one. Thereafter, the feature image generating portion 8c moves the process to step S507.

For example, the feature image generating portion 8c sets, as each pixel value of the integrated first feature image g21, a representative value such as the maximum value or the average value of the pixel values of the plurality of first pre-process images g11. This also applies to the plurality of second pre-process images g12.

<Step S507>

In step S507, the feature image generating portion 8c generates the first feature image g21, the second feature image g22, and the third feature image g23 by executing the specific part extracting process on the integrated first pre-process image g11 and the integrated second pre-process image g12. Thereafter, the feature image generating portion 8c ends the feature image generating process.

With the adoption of the present application example, a similar effect is obtained as in the case where the first application example is adopted.

Third Application Example

Figure 11:
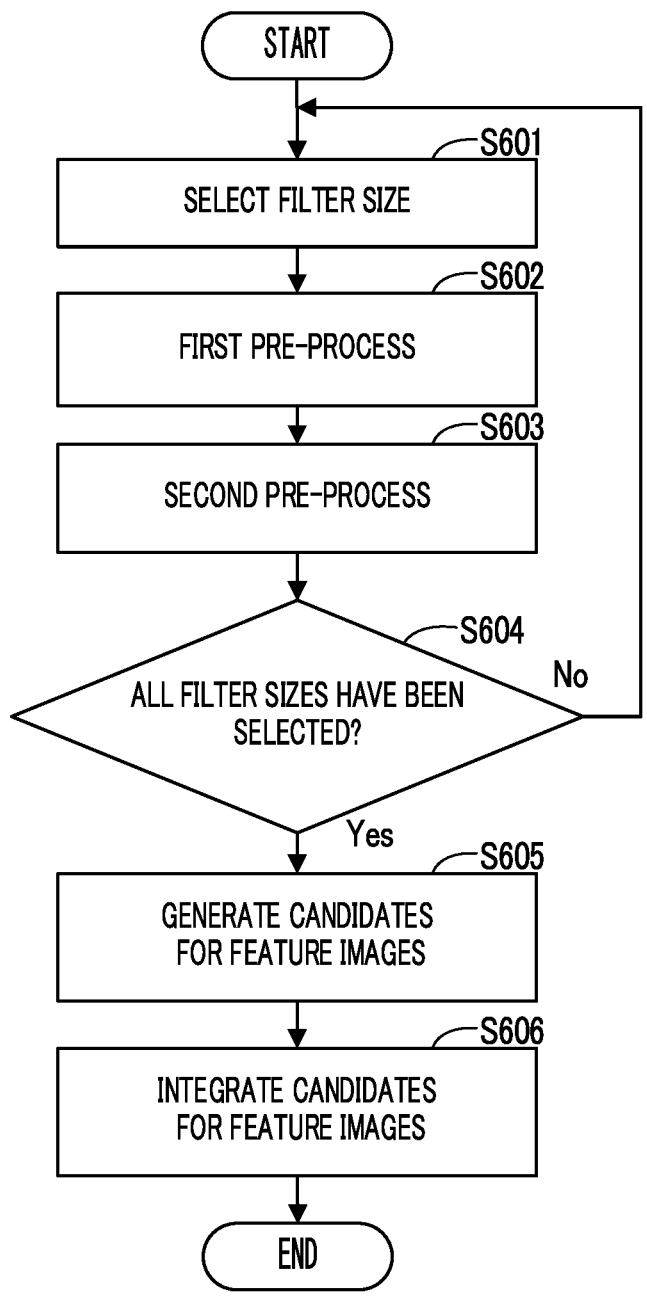
FIG. 11 is a flowchart showing an example of a procedure of the feature image generating process in a third application example of the image processing apparatus according to the embodiment.

Next, the following describes an example of a procedure of the feature image generating process according to a third application example of the image processing apparatus 10 with reference to the flowchart shown in FIG. 11.

In the following description, S601, S602, . . . are identification signs representing a plurality of steps of the feature image generating process of the present application example. The feature image generating process of the present application example starts from step S601.

In the following description, the size of the focused area Ax1 and the adjacent areas Ax2 in the first pre-process and the second pre-process is referred to as a filter size.

<Step S601>

In step S601, the feature image generating portion 8c selects a filter size to be adopted from a plurality of predetermined size candidates, and moves the process to step S602.

<Step S602>

In step S602, the feature image generating portion 8c generates the first pre-process image g11 by executing the first pre-process on the test image g1 with the filter size selected in step S601. Thereafter, the feature image generating portion 8c moves the process to step S603.

<Step S603>

In step S603, the feature image generating portion 8c generates the second pre-process image g12 by executing the second pre-process on the test image g1 with the filter size selected in step S601. Thereafter, the feature image generating portion 8c moves the process to step S604.

<Step S604>

In step S604, upon determining that the processes of steps S601 to S603 have been executed with all of the plurality of size candidates, the feature image generating portion 8c moves the process to step S605. Otherwise, the feature image generating portion 8c executes the processes of steps S601 to S603 with a different filter size.

In steps S601 to S604, the feature image generating portion 8c executes the first pre-process and the second pre-process multiple times on one test image g1 with different sizes of the focused area Ax1 and the adjacent areas Ax2. This allows the feature image generating portion 8c to generate a plurality of first pre-process images g11 and a plurality of second pre-process images g12.

<Steps S605, S606>

In steps S605 and S606, the feature image generating portion 8c executes the same processes as those of steps S406 and S407 shown in FIG. 9. Thereafter, the feature image generating portion 8c ends the feature image generating process.

With the processes of steps S605 and S606, a plurality of candidates for the first feature image g21, the second feature image g22, and the third feature image g23 are integrated, and the integrated first feature image g21, the integrated second feature image g22, and the integrated third feature image g23 are generated.

The processes of steps S601 to S604 are an example of a process to generate a plurality of first pre-process images g11 and a plurality of second pre-process images g12 by executing the first pre-process and the second pre-process multiple times with different size ratios of the size of the test image g1 to that of the focused area Ax1 and the adjacent areas Ax2. Changing the filter size is an example of changing the size ratio of the size of the test image g1 to that of the focused area Ax1 and the adjacent areas Ax2.

With the adoption of the present application example, it is possible to extract, without omission, the vertical stripes Ps11 or the horizontal stripes Ps12 of different thicknesses, or the noise points Ps13 of different sizes.

Fourth Application Example

Figure 12:
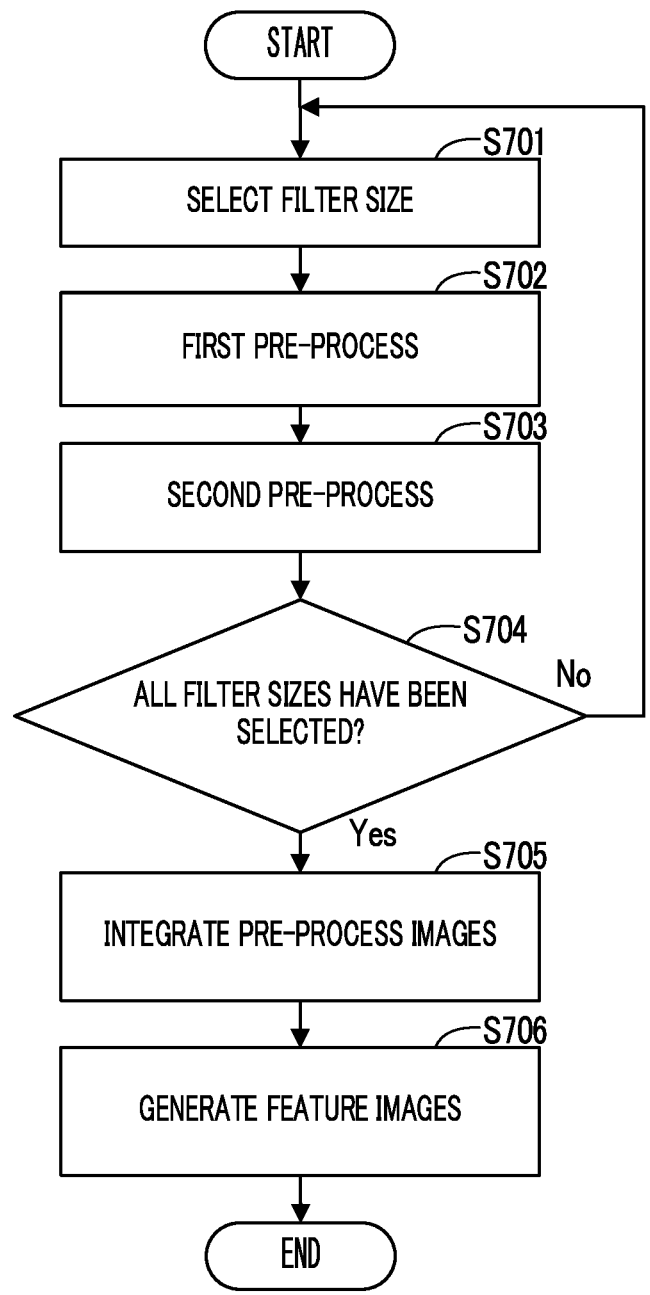
FIG. 12 is a flowchart showing an example of a procedure of the feature image generating process in a fourth application example of the image processing apparatus according to the embodiment.

Next, the following describes an example of a procedure of the feature image generating process according to a fourth application example of the image processing apparatus 10 with reference to the flowchart shown in FIG. 12.

In the following description, S701, S702, . . . are identification signs representing a plurality of steps of the feature image generating process of the present application example. The feature image generating process of the present application example starts from step S701.

<Steps S701 to S704>

The feature image generating portion 8c executes the processes of steps S701 to S704 that are the same as those of steps S601 to S604. In step S704, upon determining that the processes of steps S701 to S703 have been executed with all of the plurality of size candidates, the feature image generating portion 8c moves the process to step S705.

<Steps S705, S706>

Furthermore, the feature image generating portion 8c executes the processes of steps S705 and S706 that are the same as those of steps S506 and S507. Thereafter, the feature image generating portion 8c ends the feature image generating process.

With the adoption of the present application example, a similar effect is obtained as in the case where the first application example is adopted.

Fifth Application Example

Next, the following describes the feature image generating process according to a fifth application example of the image processing apparatus 10.

In the present application example, the feature image generating portion 8c discriminates pixels constituting the specific part Ps1 from the other pixels by comparing the pixel values of the first pre-process image g11 and the second pre-process image g12 with a predetermined reference range.

That is, in the present application example, the feature image generating portion 8c performs the specific part extracting process to identify the specific part Ps1 based on the size of each pixel value of the first pre-process image g11 and the second pre-process image g12.

Furthermore, the feature image generating portion 8c extracts the vertical stripe Ps11 by removing, from the specific part Ps1 of the first pre-process image g11, the specific part Ps1 that is common to the first pre-process image g11 and the second pre-process image g12.

Furthermore, the feature image generating portion 8c extracts the horizontal stripe Ps12 by removing, from the specific part Ps1 of the second pre-process image g12, the specific part Ps1 that is common to the first pre-process image g11 and the second pre-process image g12.

Furthermore, the feature image generating portion 8c extracts, as the noise point Ps13, the specific part Ps1 that is common to the first pre-process image g11 and the second pre-process image g12.

For example, the feature image generating portion 8c generates the first feature image g21 by converting the first pixel value Xi that was not determined as the vertical stripe Ps11 in the first pre-process image g11, into an interpolation value based on the surrounding pixel values.

Similarly, the feature image generating portion 8c generates the second feature image g22 by converting the second pixel value Yi that was not determined as the horizontal stripe Ps12 in the second pre-process image g12, into an interpolation value based on the surrounding pixel values.

Similarly, the feature image generating portion 8c generates the third feature image g23 by converting the first pixel value Xi that was not determined as the noise point Ps13 in the first pre-process image g11, into an interpolation value based on the surrounding pixel values.

Alternatively, the feature image generating portion 8c may generate the third feature image g23 by converting the second pixel value Yi that was not determined as the noise point Ps13 in the second pre-process image g12, into an interpolation value based on the surrounding pixel values.

Sixth Application Example

The following describes the image defect determination process according to a sixth application example of the image processing apparatus 10.

In general, it may be difficult, depending on the density state of each color, for an image sensor to correctly detect a gradation level of a yellow part in an image that is a mixture of yellow and other colors. Similarly, it may be difficult, depending on the density state of each color, for an image sensor to correctly detect a gradation level of a color part in an image that is a mixture of black and other colors.

In the present application example, the job control portion 8b performs the test print process to output two or three test output sheets 9 with different types of original test images g01 formed thereon.

In a case where three test output sheets 9 are output, a sheet on which an original mixed-color test image has been formed, a sheet on which an original yellow test image has been formed, and a sheet on which an original gray test image has been formed are output, wherein the original mixed-color test image is a combination of a uniform cyan single-color halftone image and a uniform magenta single-color halftone image, the original yellow test image is a uniform yellow single-color halftone image, and the original gray test image is a uniform black single-color halftone image.

In a case where two test output sheets 9 are output, a sheet on which a mixed-color test image has been formed and a sheet on which the original gray test image has been formed are output, wherein the mixed-color test image is a combination of a uniform cyan single-color halftone image, a uniform magenta single-color halftone image, and a uniform yellow single-color halftone image.

Accordingly, the test image g1 of the present application example includes the mixed-color test image, the yellow test image, and the gray test image that respectively correspond to the original mixed-color test image, the original yellow test image, and the original gray test image.

The yellow test image and the gray test image are each a halftone image of one developing color that is different from the colors mixed in the mixed-color test image. The yellow test image and the gray test image are each an example of a single-color test image.

In the present application example, the feature image generating portion 8c generates the first feature image g21, the second feature image g22, and the third feature image g23 for each of the mixed-color test images and the single-color test images read from a plurality of test output sheets 9.

Furthermore, in the present application example, the specific part identifying portion 8d identifies the positions of the specific parts Ps1 in the first feature image g21, the second feature image g22, and the third feature image g23 that respectively correspond to the mixed-color test images and the single-color test images. It is noted that the mixed-color test images and the single-color test images of the present application example are each an example of the target test image that is a particular target for identifying the specific part Ps1.

In the present application example, as is the case with the above-described embodiment, the color vector identifying portion 8e, the periodicity determining portion 8f, and the pattern recognizing portion 8g execute a process to determine the causes of the image defects, by using the first feature image g21, the second feature image g22, and the third feature image g23 corresponding to the mixed-color test images.

In the present application example, the periodicity determining portion 8f and the pattern recognizing portion 8g determine the cause of an image defect corresponding to the specific part in the mixed-color test image, from among a plurality of image creating portions 4x corresponding to a plurality of developing colors mixed in the mixed-color test image.

Furthermore, in the present application example, as is the case with the above-described embodiment, the periodicity determining portion 8f and the pattern recognizing portion 8g execute a process to determine the causes of the image defects, by using the first feature image g21, the second feature image g22, and the third feature image g23 corresponding to the single-color test images.

In the present application example, the periodicity determining portion 8f and the pattern recognizing portion 8g determine the cause of an image defect corresponding to the specific part in the single-color test image, from one of the plurality of image creating portions 4x that corresponds to the color of the single-color test image.

When the present application example is adopted, it is possible to determine the cause of the image defect based on the test output sheets 9 whose number is smaller than the total number of the developing colors used in the image forming device 2.

Seventh Application Example

The following describes the image defect determination process according to a seventh application example of the image processing apparatus 10.

In the present application example, the CPU 80 determines the cause of the image defect by executing a process instead of the process executed by the pattern recognizing portion 8g.

For example, in the present application example, the CPU 80 determines the cause of the image defect by performing a classification based on one or more of: the number of the specific parts Ps1 in the first feature image g21, the second feature image g22, or the third feature image g23; thickness or aspect ratio of the specific part Ps1; and the pixel value level of the specific part Ps1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image processing method in which a processor determines a cause of an image defect based on a mixed-color test image that is a combination of a plurality of single-color halftone images that correspond to a plurality of developing colors, the mixed-color test image being obtained through an image reading process performed on an output sheet output from an image forming device, the image processing method comprising:

the processor identifying a specific part composed of a plurality of significant pixels in the mixed-color test image;

the processor identifying a color vector that represents a vector in a color space from one of a color of the specific part in the mixed-color test image and a color of a reference area including a periphery of the specific part to the other; and the processor determining which of a plurality of image creating portions of the image forming device corresponding to the plurality of developing colors, is the cause of the image defect, based on the color vector identified from the mixed-color test image.

2. The image processing method according to claim 1, further comprising:

the processor identifying the specific part in a single-color test image that has been read from a sheet on which the single-color test image is formed, the single-color test image being a halftone image of one developing color that is different from colors mixed in the mixed-color test image; and the processor determining the cause of the image defect corresponding to the specific part in the single-color test image, from any of the plurality of image creating portions corresponding to the color of the single-color test image.

3. The image processing method according to claim 2, wherein the plurality of developing colors mixed in the mixed-color test image include cyan and magenta, and the one developing color included in the single-color test image is yellow or black.

4. The image processing method according to claim 1, wherein the processor identifying the specific part in a target test image that is the mixed-color test image or another image includes:

generating a first pre-process image by executing a first pre-process using a horizontal direction of the test image as a predetermined processing direction, the first pre-process including a main filter process in which a pixel value of each of focused pixels sequentially selected from the test image is converted to a conversion value that is obtained by performing a process to emphasize a difference between a pixel value of a focused area including the focused pixels and a pixel value of two adjacent areas that are adjacent to the focused area from opposite sides in the processing direction;

generating a second pre-process image by executing a second pre-process that includes the main filter process in which a vertical direction of the test image is used as the processing direction; and the processor executing a specific part extracting process to extract, as image defects, a first specific part, a second specific part, and a third specific part among specific parts which are each composed of one or more significant pixels and are present in the first pre-process image and the second pre-process image, the first specific part being present in the first pre-process image and not being common to the first pre-process image and the second pre-process image, the second specific part being present in the second pre-process image and not being common to the first pre-process image and the second pre-process image, the third specific part being common to the first pre-process image and the second pre-process image, and the processor determining the cause of the image defect includes the processor determining the cause of the image defect with respect to the first specific part, the second specific part, and the third specific part, individually.

5. The image processing method according to claim 4, wherein the first pre-process includes:

generating first main map data by executing the main filter process using the horizontal direction as the processing direction;

generating horizontal edge strength map data by executing an edge emphasizing filter process on the focused area and a predetermined one of the two adjacent areas on the test image, using the horizontal direction as the processing direction; and generating the first pre-process image by correcting each pixel value of the first main map data by each corresponding pixel value of the horizontal edge strength map data, and the second pre-process includes:

generating second main map data by executing the main filter process using the vertical direction as the processing direction;

generating vertical edge strength map data by executing the edge emphasizing filter process on the focused area and one of the two adjacent areas on the test image, using the vertical direction as the processing direction; and generating the second pre-process image by correcting each pixel value of the second main map data by each corresponding pixel value of the vertical edge strength map data.

6. The image processing method according to claim 4, wherein the processor determining the cause of the image defect includes:

executing a periodic specific part determination process to determine whether or not the second specific part or the third specific part has one or more predetermined periodicities in the vertical direction and determine a cause of the second specific part or the third specific part based on a result of the determination concerning periodicity; and executing a feature pattern recognition process to perform a pattern recognition on an input image to determine which of a plurality of predetermined cause candidates corresponding to the first specific part, the second specific part, and the third specific part corresponds to the input image, wherein the input image of the feature pattern recognition process is an image including the first specific part and an image including the second specific part or the third specific part that was determined in the periodic specific part determination process as not having the one or more predetermined periodicities.

7. The image processing method according to claim 6, wherein in the feature pattern recognition process, the input image is classified into one of the plurality of cause candidates based on a learning model that has been preliminarily learned using, as teacher data, a plurality of sample images corresponding to the plurality of cause candidates.

8. The image processing method according to claim 1, further comprising:

the processor executing a periodic variation determination process to determine, for each of predetermined colors with respect to a target test image that is the mixed-color test image or another image, whether or not predetermined one or more periodicities are present along a predetermined sub scanning direction, and determine whether or not a periodic density variation that is a type of image defect, has occurred, and a cause of the periodic density variation, based on a result of the determination concerning periodicity.

9. The image processing method according to claim 8, further comprising:

the processor determining with respect to the target test image for which it was determined in the periodic variation determination process that the periodicity is not present, whether or not a random density variation that is a type of image defect has occurred, by determining whether or not a pixel value variation exceeds a predetermined permissible range for each of predetermined colors.

10. The image processing method according to claim 9, further comprising:

the processor executing a random pattern recognition process to perform a pattern recognition on an input image that is the target test image for which it was determined that the random density variation had occurred, to determine which of one or more predetermined candidates for the cause of the image defect corresponds to the input image.

11. An image processing apparatus comprising the processor that executes processes of the image processing method according to claim 1.

* * * * *

UNITED STATES PATENT AND TRADEMARK OFFICE
CERTIFICATE OF CORRECTION

| | |
|---|---|
| PATENT NO. | : 11,483,452 B2 |
| APPLICATION NO. | : 17/558250 |
| DATED | : October 25, 2022 |
| INVENTOR(S) | : Koji Sato et al. |

It is certified that error appears in the above-identified patent and that said Letters Patent is hereby corrected as shown below:

On the Title Page

Item (54), and in the Specification, Column 1 Line 2, Delete "DETERMING" and replace with --DETERMINING--.

Signed and Sealed this
Tenth Day of January, 2023

*Katherine Kelly Vidal*

Katherine Kelly Vidal
*Director of the United States Patent and Trademark Office*